US008375113B2

(12) United States Patent
Sinn et al.

(10) Patent No.: US 8,375,113 B2
(45) Date of Patent: Feb. 12, 2013

(54) EMPLOYING WRAPPER PROFILES

(75) Inventors: Richard Sinn, Milpitas, CA (US); Stan Yuen, Mountain View, CA (US); Chi-Cheng Lee, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2173 days.

(21) Appl. No.: 10/325,438

(22) Filed: Dec. 20, 2002

(65) Prior Publication Data

US 2004/0010591 A1 Jan. 15, 2004

Related U.S. Application Data

(60) Provisional application No. 60/395,152, filed on Jul. 11, 2002.

(51) Int. Cl.
*G06F 15/173* (2006.01)
*G06F 15/16* (2006.01)
*G06F 17/30* (2006.01)

(52) U.S. Cl. ........ 709/223; 709/217; 709/227; 709/229; 707/781; 707/783; 726/3; 726/4; 726/27; 726/30

(58) Field of Classification Search .................. 709/217, 709/218, 223, 224, 225, 203, 227, 229; 707/9, 707/781, 783, 784; 710/200; 726/3, 4, 27, 726/30
See application file for complete search history.

(56) References Cited

U.S. PATENT DOCUMENTS

| 5,010,478 | A | 4/1991 | Deran |
| 5,077,666 | A | 12/1991 | Brimm et al. |
| 5,455,953 | A | 10/1995 | Russell |
| 5,499,371 | A | 3/1996 | Henninger et al. |
| 5,530,861 | A | 6/1996 | Diamant et al. |
| 5,581,691 | A | 12/1996 | Hsu et al. |
| 5,596,746 | A | 1/1997 | Shen et al. |
| 5,664,154 | A | 9/1997 | Purcell et al. |

(Continued)

FOREIGN PATENT DOCUMENTS

| WO | WO 02/05092 A2 * | 1/2002 |
| WO | WO 02/05185 A1 * | 1/2002 |

(Continued)

OTHER PUBLICATIONS

Vora et al., Web Access Management, U.S. Appl. No. 60/216,955, p. 1-98.*

(Continued)

*Primary Examiner* — Abdullahi Salad
*Assistant Examiner* — Wing Ma
(74) *Attorney, Agent, or Firm* — Kilpatrick Townsend & Stockton LLP

(57) ABSTRACT

Technology is disclosed for controlling access to data store information among multiple entities. A corresponding wrapper is created for information that may be subject to simultaneous access attempts. The wrapper includes an attribute that identifies the accessibility of the information—indicating whether the information is locked from further access, shareable among multiple entities, or not restricted at all. Before accessing information in the data store, an entity looks at the wrapper associated with the information to determine the type of access allowed, if any. An Identity, Access, or integrated Identity/Access System may maintain the wrappers as objects in the data store, with each wrapper object controlling another object containing information. Wrappers can be utilized when multiple provisioning applications are employed to provision resources. Each user and their corresponding resources are represented as objects with corresponding wrappers. Each provisioning application employs the wrappers to ensure that it has exclusive ownership of selected user and resource objects when provisioning resources to the selected user.

82 Claims, 14 Drawing Sheets

U.S. PATENT DOCUMENTS

| | | | |
|---|---|---|---|
| 5,678,041 A | 10/1997 | Baker et al. | |
| 5,692,125 A | 11/1997 | Schloss et al. | |
| 5,694,598 A | 12/1997 | Durand et al. | |
| 5,708,780 A | 1/1998 | Levergood et al. | |
| 5,713,023 A | 1/1998 | Hayata et al. | |
| 5,721,900 A | 2/1998 | Banning et al. | |
| 5,724,595 A | 3/1998 | Gentner | |
| 5,732,408 A | 3/1998 | Takahashi | |
| 5,734,837 A | 3/1998 | Flores et al. | |
| 5,754,939 A | 5/1998 | Herz et al. | |
| 5,764,890 A | 6/1998 | Glasser et al. | |
| 5,815,703 A | 9/1998 | Copeland et al. | |
| 5,838,970 A * | 11/1998 | Thomas | 719/316 |
| 5,848,273 A | 12/1998 | Fontana et al. | |
| 5,878,411 A | 3/1999 | Burroughs et al. | |
| 5,890,153 A * | 3/1999 | Fukuda et al. | 707/704 |
| 5,911,143 A * | 6/1999 | Deinhart et al. | 1/1 |
| 5,944,824 A | 8/1999 | He | |
| 5,991,810 A | 11/1999 | Shapiro et al. | |
| 5,991,879 A * | 11/1999 | Still | 726/1 |
| 5,999,911 A | 12/1999 | Berg et al. | |
| 6,014,666 A * | 1/2000 | Helland et al. | 1/1 |
| 6,044,465 A | 3/2000 | Dutcher et al. | |
| 6,055,637 A * | 4/2000 | Hudson et al. | 726/20 |
| 6,073,109 A | 6/2000 | Flores et al. | |
| 6,078,747 A | 6/2000 | Jewitt | |
| 6,098,056 A | 8/2000 | Rusnak et al. | |
| 6,131,120 A | 10/2000 | Reid | |
| 6,134,634 A | 10/2000 | Marshall, Jr. et al. | |
| 6,138,104 A | 10/2000 | Marchak et al. | |
| 6,141,778 A | 10/2000 | Kane et al. | |
| 6,145,003 A | 11/2000 | Sanu et al. | |
| 6,151,531 A | 11/2000 | Frankel et al. | |
| 6,158,010 A | 12/2000 | Moriconi et al. | |
| 6,163,781 A | 12/2000 | Wess, Jr. | |
| 6,182,142 B1 | 1/2001 | Win et al. | |
| 6,185,555 B1 * | 2/2001 | Sprenger et al. | 707/3 |
| 6,192,405 B1 * | 2/2001 | Bunnell | 709/225 |
| 6,195,710 B1 | 2/2001 | Borgendale et al. | |
| 6,208,986 B1 | 3/2001 | Schneck et al. | |
| 6,212,558 B1 | 4/2001 | Antur et al. | |
| 6,253,202 B1 | 6/2001 | Gilmour | |
| 6,253,239 B1 | 6/2001 | Shklar et al. | |
| 6,253,257 B1 | 6/2001 | Dundon | |
| 6,256,737 B1 | 7/2001 | Bianco et al. | |
| 6,256,739 B1 | 7/2001 | Skopp et al. | |
| 6,260,077 B1 | 7/2001 | Rangarajan et al. | |
| 6,266,420 B1 | 7/2001 | Langford et al. | |
| 6,278,993 B1 | 8/2001 | Kumar et al. | |
| 6,279,043 B1 | 8/2001 | Hayward et al. | |
| 6,314,470 B1 | 11/2001 | Ward et al. | |
| 6,323,881 B1 | 11/2001 | Broulik | |
| 6,335,927 B1 | 1/2002 | Elliott et al. | |
| 6,338,097 B1 | 1/2002 | Krenzke et al. | |
| 6,343,287 B1 | 1/2002 | Kumar et al. | |
| 6,343,339 B1 * | 1/2002 | Daynes | 710/200 |
| 6,347,312 B1 | 2/2002 | Byrne et al. | |
| 6,349,306 B1 | 2/2002 | Malik et al. | |
| 6,353,929 B1 | 3/2002 | Houston | |
| 6,366,913 B1 | 4/2002 | Fitler, Jr. et al. | |
| 6,366,987 B1 | 4/2002 | Tzeinic et al. | |
| 6,401,101 B1 | 6/2002 | Britton et al. | |
| 6,401,138 B1 | 6/2002 | Judge et al. | |
| 6,415,368 B1 | 7/2002 | Glance et al. | |
| 6,434,531 B1 | 8/2002 | Lancelot et al. | |
| 6,442,567 B1 | 8/2002 | Retallick et al. | |
| 6,490,655 B1 | 12/2002 | Kershaw | |
| 6,499,023 B1 | 12/2002 | Dong et al. | |
| 6,513,039 B1 * | 1/2003 | Kraenzel | 707/9 |
| 6,519,647 B1 * | 2/2003 | Howard et al. | 709/229 |
| 6,523,022 B1 | 2/2003 | Hobbs | |
| 6,529,941 B2 | 3/2003 | Haley et al. | |
| 6,535,879 B1 * | 3/2003 | Behera | 707/9 |
| 6,539,379 B1 | 3/2003 | Vora et al. | |
| 6,549,941 B1 | 4/2003 | Jaquith et al. | |
| 6,560,609 B1 * | 5/2003 | Frey et al. | 1/1 |
| 6,611,840 B1 | 8/2003 | Baer et al. | |
| 6,647,383 B1 | 11/2003 | August et al. | |
| 6,671,695 B2 | 12/2003 | McFadden | |
| 6,671,745 B1 | 12/2003 | Mathur et al. | |
| 6,701,368 B1 | 3/2004 | Chennapragada et al. | |
| 6,704,807 B1 | 3/2004 | Mathur et al. | |
| 6,704,873 B1 | 3/2004 | Underwood | |
| 6,708,170 B1 | 3/2004 | Byrne et al. | |
| 6,721,804 B1 | 4/2004 | Rubin et al. | |
| 6,732,178 B1 | 5/2004 | Van Horne et al. | |
| 6,732,179 B1 | 5/2004 | Brown et al. | |
| 6,741,853 B1 | 5/2004 | Jiang et al. | |
| 6,745,382 B1 * | 6/2004 | Zothner | 717/107 |
| 6,757,720 B1 | 6/2004 | Wechsler, Jr. | |
| 6,760,750 B1 | 7/2004 | Boneh et al. | |
| 6,768,988 B2 | 7/2004 | Boreham et al. | |
| 6,769,000 B1 | 7/2004 | Akhtar et al. | |
| 6,775,658 B1 * | 8/2004 | Zothner | 706/47 |
| 6,785,686 B2 | 8/2004 | Boreham et al. | |
| 6,785,713 B1 | 8/2004 | Freeman et al. | |
| 6,785,726 B1 | 8/2004 | Freeman et al. | |
| 6,839,701 B1 | 1/2005 | Baer et al. | |
| 6,880,086 B2 | 4/2005 | Kidder et al. | |
| 6,920,455 B1 * | 7/2005 | Weschler | 707/100 |
| 6,947,991 B1 * | 9/2005 | Burton et al. | 709/227 |
| 6,948,135 B1 | 9/2005 | Ruthfield et al. | |
| 6,985,912 B2 | 1/2006 | Mullins et al. | |
| 6,999,956 B2 | 2/2006 | Mullins | |
| 7,013,435 B2 | 3/2006 | Gallo et al. | |
| 7,013,469 B2 | 3/2006 | Smith et al. | |
| 7,017,183 B1 * | 3/2006 | Frey et al. | 726/5 |
| 7,028,300 B2 * | 4/2006 | Goldick | 718/104 |
| 7,035,926 B1 | 4/2006 | Cohen et al. | |
| 7,039,871 B2 | 5/2006 | Cronk | |
| 7,069,330 B1 | 6/2006 | McArdle et al. | |
| 7,076,784 B1 | 7/2006 | Russell et al. | |
| 7,107,610 B2 * | 9/2006 | Lortz | 726/4 |
| 7,114,037 B2 | 9/2006 | Agarwal et al. | |
| 7,120,914 B1 | 10/2006 | Manthos et al. | |
| 7,131,000 B2 * | 10/2006 | Bradee | 713/164 |
| 7,206,851 B2 | 4/2007 | Delaney et al. | |
| 7,213,249 B2 | 5/2007 | Tung Loo et al. | |
| 7,216,163 B2 | 5/2007 | Sinn | |
| 7,231,378 B2 * | 6/2007 | Lawson et al. | 707/2 |
| 7,231,661 B1 | 6/2007 | Villavicencio | |
| 7,249,369 B2 | 7/2007 | Knouse | |
| 7,266,595 B1 | 9/2007 | Black et al. | |
| 7,340,447 B2 | 3/2008 | Ghatare | |
| 7,349,912 B2 | 3/2008 | Delany et al. | |
| 7,363,339 B2 | 4/2008 | Delany et al. | |
| 7,366,724 B2 * | 4/2008 | Frieden et al. | 1/1 |
| 7,380,008 B2 | 5/2008 | Teng et al. | |
| 7,398,311 B2 | 7/2008 | Joshi et al. | |
| 7,406,519 B2 * | 7/2008 | Goldick | 709/225 |
| 7,428,523 B2 | 9/2008 | Tsang et al. | |
| 7,428,592 B2 | 9/2008 | Lee et al. | |
| 7,447,701 B2 | 11/2008 | Agarwal | |
| 7,467,142 B2 | 12/2008 | Sinn et al. | |
| 7,478,407 B2 | 1/2009 | Jain et al. | |
| 7,512,585 B2 | 3/2009 | Agarwal et al. | |
| 7,562,232 B2 * | 7/2009 | Zuili et al. | 713/194 |
| 7,613,794 B2 | 11/2009 | Delaney et al. | |
| 7,680,819 B1 * | 3/2010 | Mellmer et al. | 707/783 |
| 2002/0032684 A1 | 3/2002 | Kobayashi et al. | |
| 2002/0038306 A1 | 3/2002 | Griffin et al. | |
| 2002/0049749 A1 | 4/2002 | Helgeson et al. | |
| 2002/0067370 A1 | 6/2002 | Forney et al. | |
| 2002/0073180 A1 | 6/2002 | Dewhurst et al. | |
| 2002/0083178 A1 | 6/2002 | Brothers | |
| 2002/0095414 A1 * | 7/2002 | Barnett et al. | 707/9 |
| 2002/0133579 A1 * | 9/2002 | Bernhardt et al. | 709/223 |
| 2002/0138763 A1 | 9/2002 | Delany et al. | |
| 2002/0161766 A1 | 10/2002 | Lawson et al. | |
| 2003/0028752 A1 | 2/2003 | Fu et al. | |
| 2003/0037052 A1 | 2/2003 | Kitain et al. | |
| 2003/0041076 A1 * | 2/2003 | Lucovsky et al. | 707/500 |
| 2003/0046266 A1 | 3/2003 | Mullins et al. | |
| 2003/0055762 A1 | 3/2003 | Holt | |
| 2003/0055806 A1 | 3/2003 | Wong et al. | |
| 2003/0065558 A1 | 4/2003 | Shaw et al. | |
| 2003/0074456 A1 * | 4/2003 | Yeung et al. | 709/229 |

| | | | |
|---|---|---|---|
| 2003/0083908 A1 | 5/2003 | Steinmann | |
| 2003/0088708 A1 | 5/2003 | Lewallen | |
| 2003/0093524 A1* | 5/2003 | Goldick | 709/225 |
| 2003/0097380 A1 | 5/2003 | Mulhern et al. | |
| 2003/0105733 A1 | 6/2003 | Boreham et al. | |
| 2003/0105742 A1 | 6/2003 | Boreham et al. | |
| 2003/0105871 A1* | 6/2003 | Goldick | 709/229 |
| 2003/0115196 A1 | 6/2003 | Boreham et al. | |
| 2003/0115548 A1 | 6/2003 | Melgar | |
| 2003/0120593 A1 | 6/2003 | Bansal et al. | |
| 2003/0120601 A1 | 6/2003 | Ouye et al. | |
| 2003/0144982 A1 | 7/2003 | Reulein et al. | |
| 2003/0145074 A1 | 7/2003 | Penick | |
| 2003/0154381 A1* | 8/2003 | Ouye et al. | 713/182 |
| 2003/0204481 A1 | 10/2003 | Lau | |
| 2003/0208397 A1 | 11/2003 | VanDusen | |
| 2003/0217127 A1 | 11/2003 | Sinn | |
| 2003/0217333 A1 | 11/2003 | Smith et al. | |
| 2004/0003351 A1 | 1/2004 | Sommerer et al. | |
| 2004/0024762 A1 | 2/2004 | Agarwal et al. | |
| 2005/0171958 A9* | 8/2005 | Cheng et al. | 707/100 |
| 2005/0240490 A1 | 10/2005 | Mackey | |
| 2006/0136637 A1* | 6/2006 | Goldick | 710/200 |

FOREIGN PATENT DOCUMENTS

WO  WO 02/052433 A1 *  7/2002

OTHER PUBLICATIONS

Object. (2001). In Hargrave's Communications Dictionary, Wiley. Retrieved from http://www.credoreference.com/entry/hargravecomms/object.*

Kim, K.H., "APIs for Real-Time Diistributed Object Programming", Coputer, IEEE Jun. 2000, pp. 72-80.

McLellan, et al., "Building More Usable APIs", IEEE Software, pp. 78-86, May/Jun. 1998.

Saba—Products, Saba Enterprise 5, dated 1997-2006, 2 pages.

Saba—Company, dated 1997-2006, 1 page.

Saba—Solutions, Competency-Driven HCM, dated 1997-2006, 1 page.

Saba—Talent, dated 1997-2006, 2 pages.

Saba—Collaboration, dated 1997-2006, 1 page.

Stets, et al., "Component-Based APIs for Versioning and Distributed Applications", IEEE, pp. 54-61, 1999.

U.S. Appl. No. 09/570,276, Office Action dated Nov. 14, 2006, 28 pages.

U.S. Appl. No. 10/314,888, Office Action dated Jul. 26, 2006, 26 pages.

U.S. Appl. No. 10/314,888, Office Action dated Feb. 9, 2007, 34 pages.

U.S. Appl. No. 10/325,465, Office Action dated Sep. 19, 2006, 25 pages.

U.S. Appl. No. 10/327,607, Office Action dated Apr. 18, 2006, 33 pages.

U.S. Appl. No. 10/328,920, Office Action dated May 31, 2006, 20 pages.

U.S. Appl. No. 10/345,879, Office Action dated Oct. 5, 2006, 30 pages.

U.S. Appl. No. 10/354,913, Office Action dated May 12, 2006, 16 pages.

Leon, McAfee's NetTools Promises to Ease Network Desktop Diagnosis, InfoWorld, San Mateo, Jul. 24, 1995, vol. 17, Iss. 30, p. 53.

Cooney, IBM rolls out host- and server-based mgmt. apps, Network World, Framingham, Feb. 6, 1995, vol. 12, Iss. 6, pp. 6-7.

Walsh, Remedy releases three applications for help-desk suite, InfoWorld, San Mateo, Apr. 21, 1997, vol. 19, Iss. 16, p. 34.

Schmersal, Testing to maintain service standards, Communications News, Nokomis, Mar. 1998, vol. 35, Iss. 3, pp. 22-23.

Musthaler, The trouble with help desk selection, Network World, Framingham, Feb. 20, 1995, vol. 12, Iss. 8, pp. 35-39.

Clear Trust, Unified Access Management, Securant Technologies, Inc., pp. 1-23, 1997.

SiteMinder Agent Operations, Verson 4.0, Netegrity Inc., 1997.

SiteMinder Deployment Guide, Version 4.0, Netegrity Inc., 1997.

SiteMinder Policy Server Operations Guide, Version 4.0, Netegrity Inc., 1997.

SiteMinder Developer's API Guide, Version 4.0, Netegrity Inc., 1997.

SiteMinder Installation Guide, Version 4.0, Netegrity Inc., 1997.

U.S. Appl. No. 10/314,888, Office Action dated Jul. 27, 2007, 37 pages.

U.S. Appl. No. 10/314,888, Final Office Action dated Feb. 22, 2008, 37 pages.

U.S. Appl. No. 10/325,465, Final Office Action dated Apr. 4, 2007, 25 pages.

U.S. Appl. No. 10/325,465, Advisory Action dated Jun. 19, 2007, 3 pages.

U.S. Appl. No. 10/325,465, Office Action dated Dec. 12, 2007, 20 pages.

U.S. Appl. No. 10/327,607, Final Office Action dated Oct. 10, 2006, 33 pages.

U.S. Appl. No. 10/327,607, Office Action dated Apr. 30, 2007, 31 pages.

U.S. Appl. No. 10/327,607, Final Office Action dated Nov. 16, 2007, 35 pages.

U.S. Appl. No. 10/327,607, Advisory Action dated Feb. 4, 2008, 3 pages.

U.S. Appl. No. 10/328,920, Notice of Allowance dated Dec. 5, 2006, 8 pages.

U.S. Appl. No. 10/345,873, Notice of Allowance dated Jul. 6, 2006, 6 pages.

U.S. Appl. No. 10/345,879, Final Office Action dated May 17, 2007, 39 pages.

U.S. Appl. No. 10/345,879, Advisory Action dated Jul. 27, 2007, 5 pages.

U.S. Appl. No. 10/345,879, Office Action dated Oct. 31, 2007, 35 pages.

U.S. Appl. No. 10/354,913, Final Office Action dated Oct. 31, 2006, 15 pages.

U.S. Appl. No. 10/354,913, Final Office Action dated Apr. 18, 2007, 20 pages.

U.S. Appl. No. 10/354,913, Ex Parte Quayle Action dated Nov. 1, 2007, 7 pages.

U.S. Appl. No. 10/354,913, Office Action dated Feb. 7, 2008, 10 pages.

U.S. Appl. No. 10/354,914, Office Action dated Sep. 22, 2006, 8 pages.

U.S. Appl. No. 10/354,914, Final Office Action dated Apr. 5, 2007, 9 pages.

U.S. Appl. No. 10/354,914, Notice of Allowance dated Mar. 12, 2008, 11 pages.

U.S. Appl. No. 10/314,888, Office Action dated Jan. 26, 2006, 31 pages.

U.S. Appl. No. 10/327,607, Office Action dated Feb. 13, 2006, 5 pages.

U.S. Appl. No. 10/345,873, Office Action dated Sep. 9, 2005, 13 pages.

U.S. Appl. No. 10/345,873, Office Action dated Mar. 10, 2006, 7 pages.

U.S. Appl. No. 10/354,913, Office Action dated Sep. 9, 2003, 19 pages.

U.S. Appl. No. 10/354,913, Final Office Action dated Apr. 6, 2004, 22 pages.

U.S. Appl. No. 10/354,913, Office Action dated Apr. 15, 2005, 20 pages.

U.S. Appl. No. 10/354,913, Final Office Action dated Dec. 5, 2005, 15 pages.

U.S. Appl. No. 10/354,914, Office Action dated Aug. 1, 2005, 15 pages.

U.S. Appl. No. 10/354,914, Final Office Action dated Feb. 10, 2006, 16 pages.

Jung-Jang Jeng, "An Approach to Designing Reusable Service Frameworks via Virtual Service Machine," ACM, May 18-20, 2001, pp. 58-66.

Nenad Medvidovic et al., "Modeling Software Architectures in the Unified Modeling Language," ACM, Jan. 2002, pp. 2-57.

U.S. Appl. No. 10/314,888, Advisory Action dated May 30, 2008, 3 pages.
U.S. Appl. No. 10/327,607, Notice of Allowance dated Aug. 6, 2008, 36 pages.
U.S. Appl. No. 10/354,913, Notice of Allowance dated Jun. 12, 2008, 8 pages.
U.S. Appl. No. 11/684,796, Advisory Action dated Aug. 13, 2008, 4 pages.
U.S. Appl. No. 11/684,796, Final Office Action dated Jun. 17, 2008, 22 pages.
U.S. Appl. No. 10/952,592, Final Office Action dated May 3, 2007, 54 pages.
U.S. Appl. No. 10/314,888, Notice of Allowance dated Dec. 31, 2008, 59 pgs.
U.S. Appl. No. 10/314,888, Requirement for Election/Restriction Requirement dated Sep. 3, 2008, 5 pages.
U.S. Appl. No. 10/325,465, Notice of Allowance dated Sep. 9, 2008, 9 pages.
U.S. Appl. No. 10/345,879, Notice of Allowance dated May 19, 2008, 6 pages.
U.S. Appl. No. 10/345,879 Final Office Action dated Apr. 15, 2008, 11 pages.
U.S. Appl. No. 11/684,796, Notice of Allowance dated Jun. 26, 2009, 6 pages.
U.S. Appl. No. 11/684,796, Advisory Action dated May 4, 2009, 3 pages.
U.S. Appl. No. 11/684,796, Final Rejection dated Feb. 25, 2009, 17 pages.
U.S. Appl. No. 11/684,796, Non-Final Rejection dated Oct. 24, 2008, 17 pages.

* cited by examiner

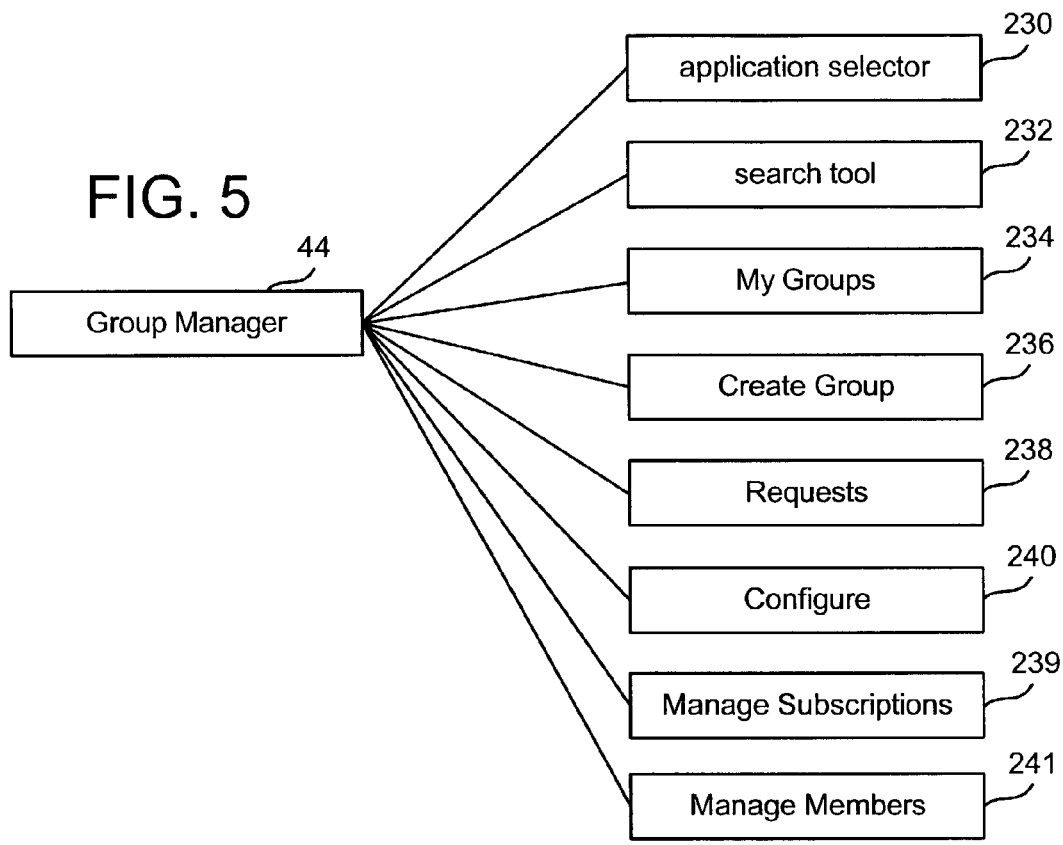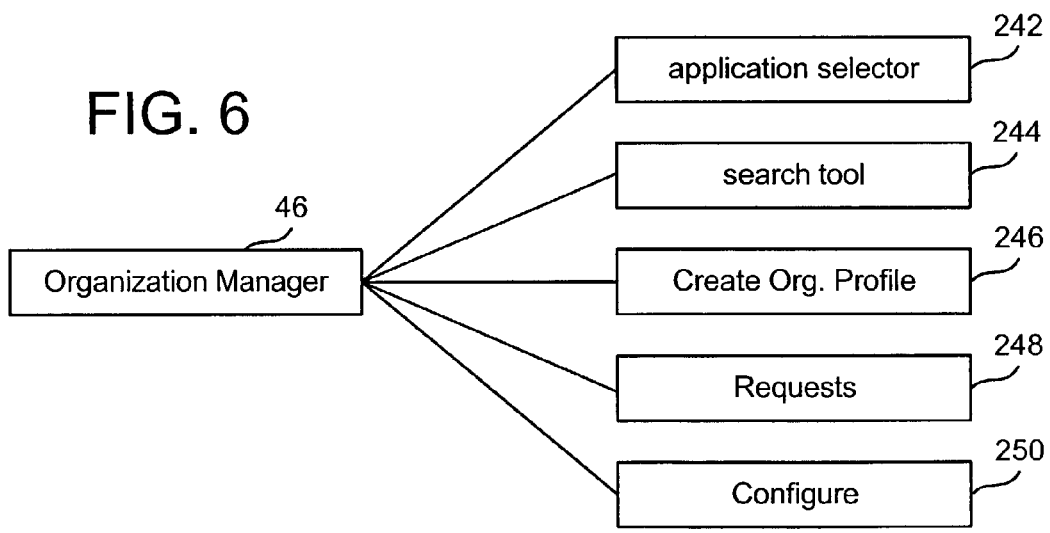

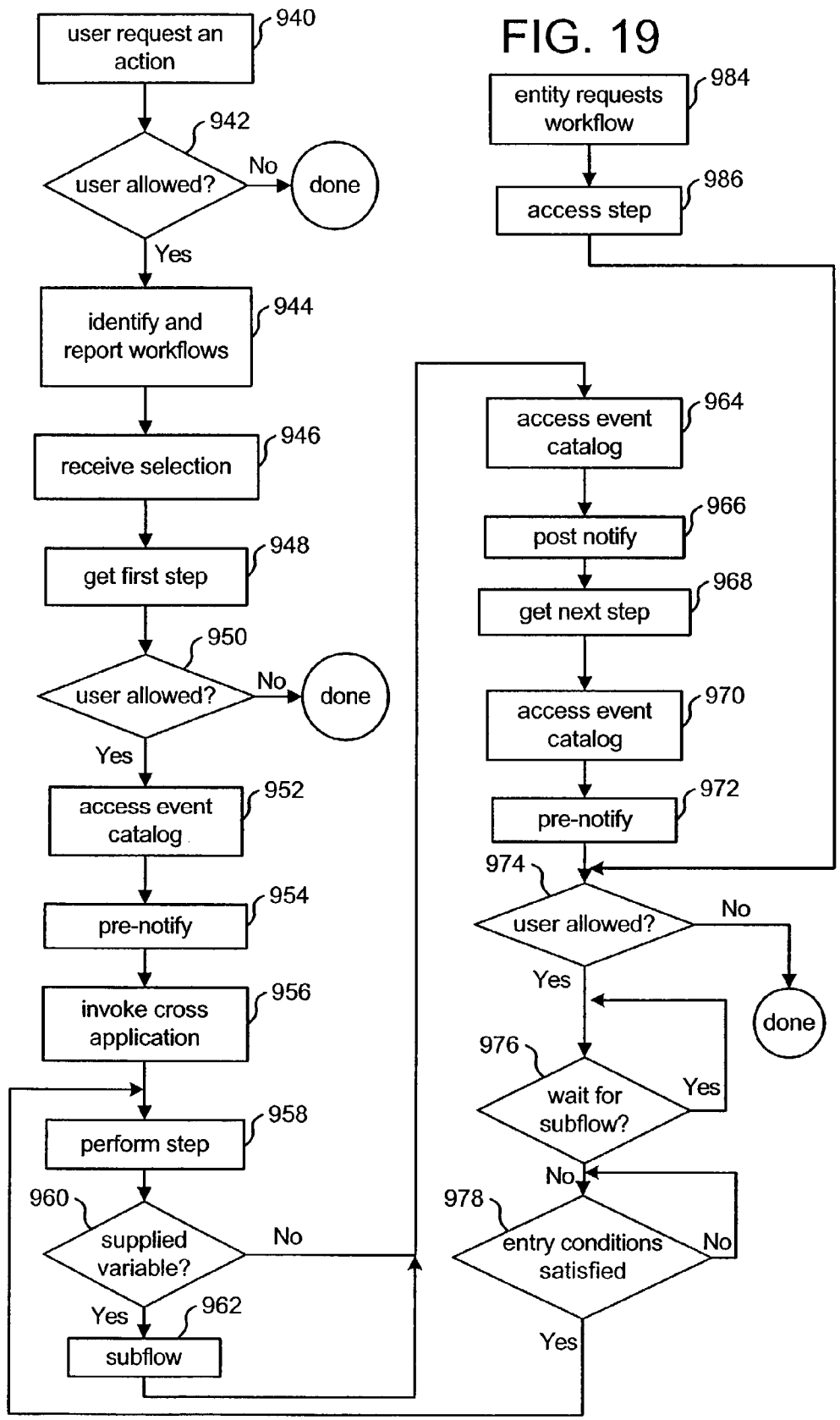

EMPLOYING WRAPPER PROFILES

CROSS-REFERENCE TO RELATED APPLICATIONS

This application claims the benefit of U.S. Provisional Application No. 60/395,152, "Access and Identity System," filed on Jul. 11, 2002, which is incorporated herein by reference.

This Application is related to the following U.S. patent applications:

"Preparing Output XML Based on Selected Programs and XML Templates," by Michele C. Lee, U.S. patent application Ser. No. 09/997,410, filed Nov. 30, 2001; and "Provisioning Bridge Server," by Richard P. Sinn, U.S. patent application Ser. No. 10/146,150, filed May 15, 2002.

Each of these related Applications are incorporated herein by reference.

BACKGROUND OF THE INVENTION

1. Field of the Invention

The present invention is directed to technology for supporting a framework for controlled access of common data store information among multiple accessing entities.

2. Description of the Related Art

With the growth of the Internet, the use of networks and other information technologies, Identity Systems have become more popular. In general, an Identity System provides for the creation, removal, editing and other managing of identity information stored in various types of data stores. The identity information pertains to users, groups, organizations and/or things. For each entry in the data store, a set of attributes are stored. For example, the attributes stored for a user may include a name, address, employee number, telephone number, email address, user ID and password. The Identity System can also manage access privileges that govern what an entity can view, create, modify or use in the Identity System. Often, this management of access privileges is based on one or more specific attributes, membership in a group and/or association with an organization.

In some instances, multiple applications running within the Identity System or outside of the Identity System want to access the same information in the data store. For example, the Identity System may include multiple identity servers that each wish to access the same profile of a user maintained in the data store. No conflict occurs if multiple identity server applications read the same data store information, such as attributes in the user profile.

One of the applications, however, may need to modify the user profile. If the other applications access the profile before the modification is complete, they may obtain stale data. During a resource provisioning process, the profile may undergo multiple modifications—making it undesirable to give any entity access to the profile other than the resource provisioning entity. It is desirable to implement a framework that facilitates the controlled access of common data store information among multiple accessing entities.

Some Identity System users also employ an Access Systems. An Access System provides for the authentication and authorization of users attempting to access resources. For efficiency purposes, there is an advantage to integrating the Identity System and the Access System. For example, both systems may utilize information in a common data store. Additionally, integrating the Identity System and the Access System allows for single-sign-on functionality across multiple resources. Thus, there is also a need to support a framework for controlled access of common data store information among multiple accessing entities for Access Systems and integrated Identity/Access Systems. Systems other than Identity and Access Systems can also benefit from such an access control framework.

SUMMARY OF THE INVENTION

The present invention, roughly described, pertains to technology that provides a framework for controlling access to common data store information among multiple entities. In one embodiment, a corresponding wrapper is created for information that may be subject to simultaneous access attempts. The wrapper includes an attribute that identifies the accessibility of the information—indicating whether the information is locked from further access, shared among multiple entities, or not locked at all. Further embodiments of the wrapper provide additional attributes that are useful to a controlled access framework. Before accessing information in the data store, an entity looks at the wrapper associated with the information to determine the type of access allowed, if any.

In one embodiment, an Identity System maintains the wrappers as objects in the data store. Each wrapper object corresponds to another object for the purpose of controlling access to that object. In one example, wrapper objects control access to user profiles and resource profiles maintained as objects in the data store. Each user profile contains attributes relating to an Identity System user, and each resource profile contains attributes relating to resources that need to be provisioned to one or more Identity System users. In further examples, wrapper objects are used to control access to many different types of objects in different types of systems, like an Access System or integrated Identity/Access System.

Wrappers for user and resource profiles are useful for controlling access to these profiles when resources are provisioned. When a user profile is created or modified, it may become necessary to provision a new resource to the user. One embodiment of the present invention generates resource profiles that correspond to some or all of the resources that need to be provisioned to the user. The Identity System creates wrapper profiles for the user profile and each resource profile. A request for provisioning is issued, and an entity responsible for managing provisioning, such as a provisioning bridge server, services the provisioning request.

In one embodiment, the provisioning bridge server employs the wrappers that correspond to the profiles for the user and each resource that needs provisioning. The provisioning bridge server uses the wrappers to ensure that another entity has not locked the user and resource profiles. If the profiles are not locked, the provisioning bridge server sets locking status attributes in the corresponding wrappers to lock the user and resource profiles. Once the profiles are locked, provisioning proceeds. When provisioning is complete, the user and resource profiles are updated and the corresponding wrappers' attributes are set to unlock the profiles. In a further implementation, wrappers are deleted if they have no further use.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors. The processors can be in communication with one or more storage devices, peripherals and/or communication interfaces.

These and other objects and advantages of the present invention will appear more clearly from the following description in which the preferred embodiment of the invention has been set forth in conjunction with the drawings.

BRIEF DESCRIPTION OF THE DRAWINGS

FIG. 5 is a block diagram depicting the Group Manager.

FIG. 6 is a block diagram depicting the Organization Manager.

FIG. 19 is a flowchart describing one embodiment of a process for using a workflow.

DETAILED DESCRIPTION

Figure 1:
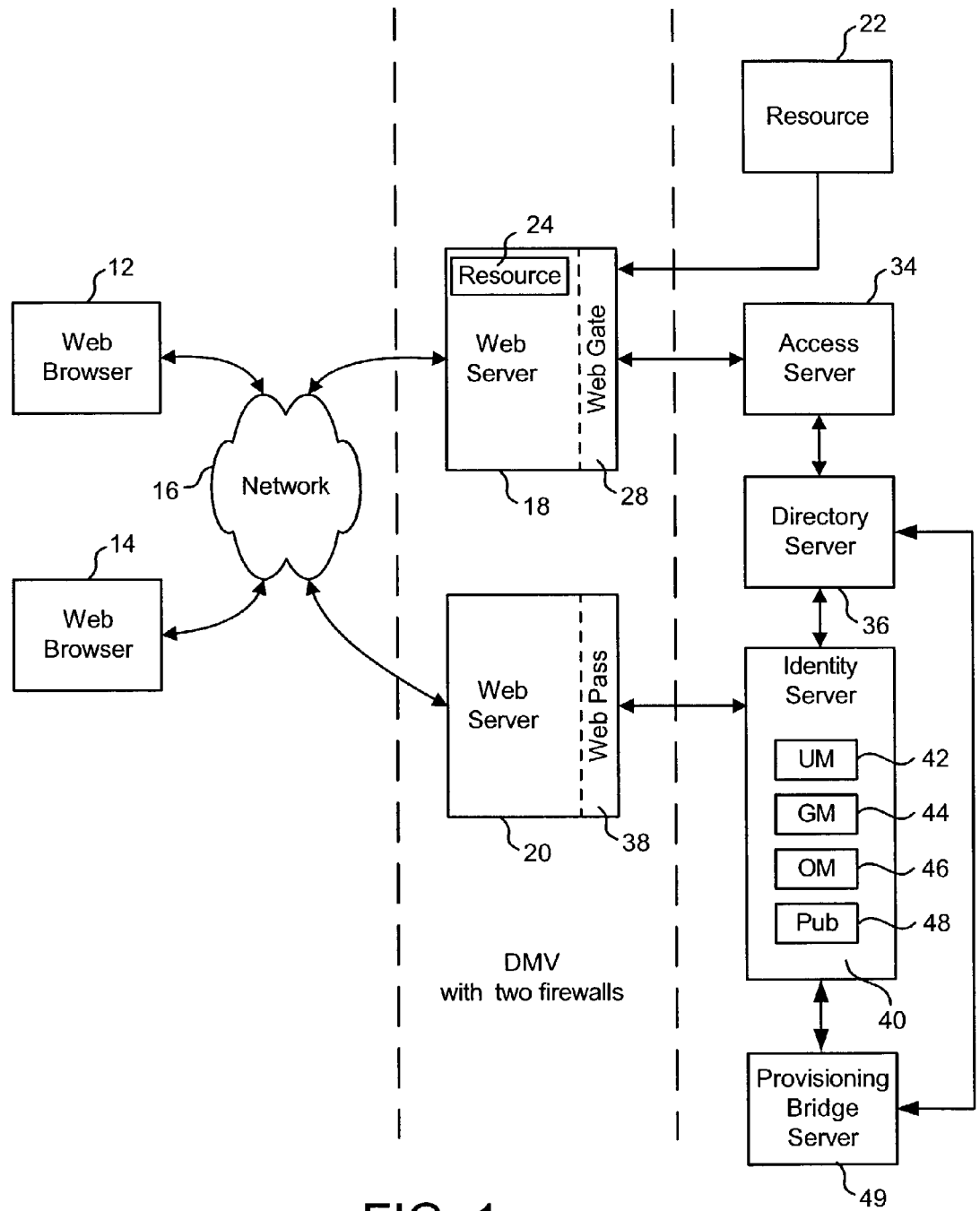
FIG. 1 is a block diagram depicting the components of one embodiment of the present invention.

FIG. 1 depicts an example of an access management system that provides identity management services and/or access management services for a network. The identity management portion of the system (hereinafter "the Identity System") manages identity profiles, while the access management portion of the system (hereinafter "the Access System") provides security for resources across one or more Web Servers (or other components). A key feature of one embodiment of this system is the centralization of the repositories for policies and identity profiles, while decentralizing their administration. That is, one embodiment of the system centralizes the policy and identity repositories by building them on a directory service technology. The system decentralizes their administration by hierarchy delegating administrative roles. Although the system of FIG. 1 includes an Identity System and an Access System, other embodiments may only include an Identity System or only include an Access System.

FIG. 1 is a block diagram depicting one embodiment for deploying an integrated Identity System and Access System. FIG. 1 shows web browsers 12 and 14 accessing Web Server 18 and/or Web Server 20 via network 16. One example of a network is the Internet. In one embodiment, web browsers 12 and 14 are standard web browsers known in the art running on any suitable type of computer. FIG. 1 depicts web browsers 12 and 14 communicating with Web Server 18 and Web Server 20 using HTTP over the Internet; however, other protocols and networks can also be used.

Web Server 18 is a standard Web Server known in the art and provides an end user with access to various resources via network 16. One embodiment includes two firewalls. A first firewall (see dotted lines) is connected between network 16 and Web Server 18. A second firewall (see dotted lines) is connected between Web Servers 16 and 18 and Access Server 34/Identity Server 40.

FIG. 1 shows two types of resources: resource 22 and resource 24. Resource 22 is external to Web Server 18 but can be accessed through Web Server 18. Resource 24 is located on Web Server 18. A resource can be anything that is possible to address with a uniform resource locator (URL, see RFC 1738). A resource can include a web page, software application, file, database, directory, data unit, etc. In one embodiment, a resource is anything accessible to a user via a network. The network could be the Internet, a LAN, a WAN, or any other type of network.

FIG. 1 shows Web Server 18 including Web Gate 28, which is a software module. In one embodiment, Web Gate 28 is a plug-in to Web Server 18. Web Gate 28 communicates with Access Server 34. Access Server 34 communicates with Directory 36.

The Access System includes Access Server 34, Web Gate 28, and Directory 36. Access Server 34 provides authentication, authorization, auditing and logging services. It further provides for identity profiles to be used across multiple domains and for access based on a single web-based authentication (sign-on). Web Gate 28 acts as an interface between Web Server 18 and Access Server 34. Web Gate 28 intercepts requests from users for resources 22 and 24, and authorizes them via Access Server 34. Access Server 34 is able to provide centralized authentication, authorization, and auditing services for resources hosted on or available to Web Server 18 and other Web Servers.

The Identity System includes Web Pass 38, Identity Server 40 and Directory 36. Identity Server 40 manages identity profiles. An identity profile is a set of information associated with a particular entity (e.g. user, group, organization, etc.). The data elements of the identity profile are called attributes. An attribute may include a name, a value and access criteria. The Identity Server includes three main applications, which effectively handle the identity profiles and privileges of the user population: User Manager 42, Group Manager 44, and Organization Manager 46. User Manager 42 manages the identity profiles for individual users. Group Manager 44 manages identity profiles for groups. Organization Manager 46 manages identity profiles for organizations. Identity Server 40 also includes Publisher 48, an application that enables entities to quickly locate and graphically view information stored by Directory 36. In one embodiment, Web Pass 38 is a Web Server plug-in that sends information back and forth between Identity Server 40 and the Web Server 20, creating a three-tier architecture. The Identity System also provides a Certificate Processing Server (not shown in FIG. 1) for managing digital certificates.

User Manager 42 handles the functions related to user identities and access privileges, including creation and deletion of user identity profiles, modification of user identity profile data, determination of access privileges, and credentials management of both passwords and digital certificates. With User Manager 42, the create, delete, and modify functions of user identity management can be set as flexible, multi-step workflows. Each business can customize its own approval, setup, and management processes and have multiple processes for different kinds of users.

Group Manager 44 allows entities to create, delete and manage groups of users who need identical access privileges to a specific resource or set of resources. Managing and controlling privileges for a group of related people-rather than handling their needs individually—yield valuable economies of scale. Group Manager 44 meets a wide range of e-business needs: easy creation, maintenance, and deletion of permanent and ad hoc groups of users who may be allowed or denied access to particular resources; modification and adaptation of groups and their access privileges with minimal disruption to the directory server's underlying schema; efficient addition and deletion of users from established groups; and delegation of administrative responsibility for group membership and subscription requests and approvals.

With Group Manager 44, companies (or other entities) can allow individual users to do the following: (1) self-subscribe to and unsubscribe from groups, (2) view the groups that they are eligible to join or have joined, and (3) request subscription to groups that have access to the applications they need. Multi-step workflows can then define which users must obtain approval before being added to a group and which can be added instantly. Group Manager 44 also lets organizations form dynamic groups specified by an LDAP filter. The ability to create and use dynamic groups is extremely valuable because it eliminates the administrative headache of continually keeping individual, static membership up-to-date. With dynamic group management features, users can be automatically added or removed if they meet the criteria specified by the LDAP filter. Dynamic groups also greatly enhance security since changes in user identities that disqualify someone from membership in a group are automatically reflected in the dynamic group membership.

The third main application in the Identity System, Organization Manager 46, streamlines the management of large numbers of organizations within an e-business network, including partners, suppliers, or even major internal organizations such as sales offices and business units. Certain infrastructure security and management operations are best handled—or can only be handled—at the highest organizational unit level rather than at the individual or group level. Like User Manager and Group Manager, this application relies on multi-step workflow and delegation capabilities. Organization Manager handles the following administrative tasks: (1) organization lifecycle management, whereby companies can create, register, and delete organizations in their systems using customizable workflows; (2) maintenance of organization profiles on an attribute-by-attribute basis through self-service, delegated administration and system-initiated activities; (3) organization self-registration, whereby organizations such as business partners, customers and suppliers can self-generate a request to be added to the e-business network; and (4) creation of reusable rules and processes through multi-step workflows.

Provisioning Bridge Server 49 provisions tasks among provisioning systems (not shown) external to the Identity System. In one embodiment, Provisioning Bridge Server 49 supports multiple provisioning systems. Provisioning Bridge System 49 is in communication with Identity Server 40 and Directory Server 36—receiving task requests from Identity Server 40 and maintaining control information in Directory Server 36. In one implementation, Provisioning Bridge Server 49 is part of the Identity System, while in other embodiments it is not. The tasks provisioned by Provisioning Bridge Server 49 provide or remove external resource access for entities managed by the Identity System, such as users. Examples of external resources include computer and telephone systems. Greater details about Provisioning Bridge Server 49 are provided below.

The various components of FIG. 1 can be implemented by software running on computing devices. Many different types of computing devices can be used, including servers, mainframes, minicomputers, personal computers, mobile computing devices, etc. Typically, such computing devices will have one or more processors that are programmed by code that is stored in one or more processor readable storage devices. The one or more processors are in communication with the processor readable storage devices, peripherals (e.g. keyboards, monitors, pointing devices, printers, etc.) and communication interfaces (e.g. network interfaces, modems, wireless transmitters/receivers, etc.).

The system of FIG. 1 is scalable. There can be many Web Servers, many Access Servers, and many Identity Servers. In one embodiment, Directory 36 is a Directory Server and communicates with other servers/modules using LDAP or LDAP over SSL. In other embodiments, Directory 36 can implement other protocols or can be other types of data repositories (e.g. relational database using SQL, etc.). Many variations of the system of FIG. 1 can be used with the present invention. For example, instead of accessing the system with a web browser, an API can be used. Alternatively, portions of functionality of the system at FIG. 1 can be separated into independent programs that can be accessed with a URL.

To understand how the system of FIG. 1 protects a resource, first consider the operation of unprotected resources. With a typical unprotected resource, end users cause their browsers to send a request to a Web Server. The request is usually an HTTP request, which includes a URL. The Web Server then translates, or maps, the URL into a file system's name space and locates the matching resource. The resource is then returned to the browser.

With the system of FIG. 1 deployed, Web Server 18 (enabled by Web Gate 28, Access Server 34, and Directory 36) can make informed decisions based on default and/or specific rules about whether to return requested resources to an end user. The rules are evaluated based on the end user's identity profile, which is managed by the Identity System. In one embodiment of the present invention, the general method proceeds as follows. An end user enters a URL or an identification of a requested resource residing in a protected policy domain. The user's browser sends the URL as part of an HTTP request to Web Server 18. Web Gate 28 intercepts the request. If the end user has not already been authenticated, Web Gate 28 causes Web Server 18 to issue a challenge to the browser for log-on information.

The received log-on information is passed back to Web Server 18 and on to Web Gate 28. Web Gate 28 in turn makes an authentication request to Access Server 34, which determines whether the user's supplied log-on information is authentic or not. Access Server 34 performs the authentication by accessing attributes of the user's identity profile and the resource's authentication criteria stored on Directory 36. If the user's supplied log-on information satisfies the authentication criteria, the process flows as described below; otherwise, the end user is notified that access to the requested resource is denied and the process halts.

After authenticating the user, Web Gate 28 queries Access Server 34 about whether the user is authorized to access the resource requested. Access Server 34 in turn queries Directory 36 for the appropriate authorization criteria for the requested resource. Access Server 34 retrieves the authorization criteria for the resource and answers Web Gate 28's authorization query, based on the resource's authorization criteria and the user's identity profile. If the user is authorized, the user is granted access to the resource; otherwise, the user's request is denied. Various alternatives to the above described flow are also within the spirit and scope of the present invention.

Authentication and Authorization decisions are based on policy domains and policies. A policy domain is a logical grouping of Web Server host ID's, host names, URL prefixes, and rules. Host names and URL prefixes specify the course-grain portion of the web name space a given policy domain protects. Rules specify the conditions in which access to requested resources is allowed or denied, and to which end users these conditions apply. Policy domains contain two levels of rules: first level default rules and second level rules contained in policies. First level default rules apply to any resource in a policy domain not associated with a policy.

A policy is a grouping of a URL pattern, resource type, operation type (such as a request method), and policy rules. These policy rules are the second level rules described above. Policies are always attached to a policy domain and specify the fine-grain portion of a web name space that a policy protects. In practice, the host names and URL prefixes from the policy's policy domain are logically concatenated with the policy's URL pattern. The resulting overall pattern is compared to the incoming URL. If there is a match, then the policy's various rules are evaluated to determine whether the request should be allowed or denied; if there is not a match, then default policy domain rules are used.

Figure 2:
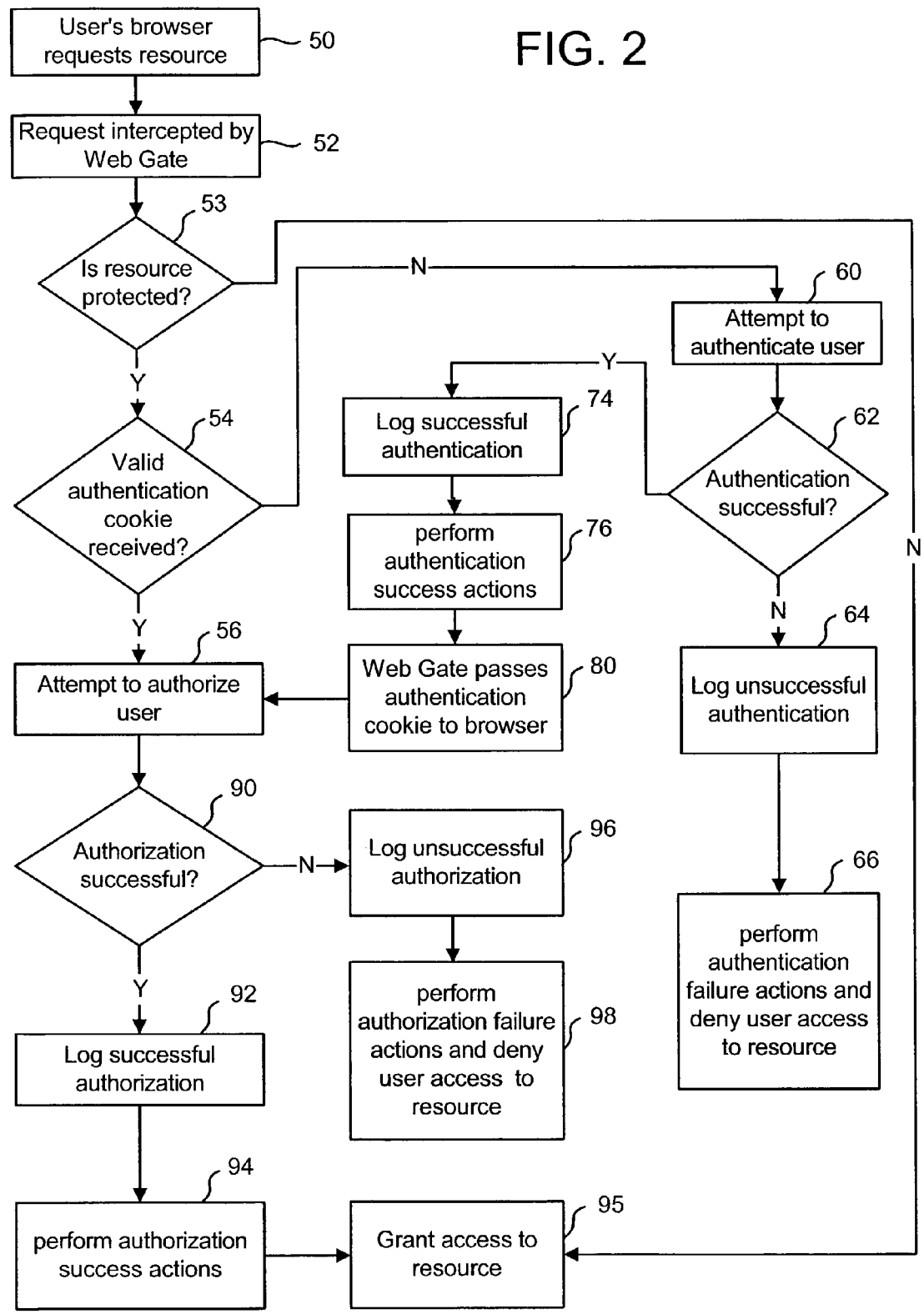
FIG. 2 is a flow chart describing one embodiment of a process for authenticating and authorizing.

FIG. 2 provides a flow chart for one embodiment of a method for authenticating and authorizing. A user's browser 12 requests a web-enabled resource 22 or 24 (step 50). The request is intercepted by Web Gate 28 (step 52). The method then determines whether the requested resource is protected by an authentication and/or authorization rule (step 53). If the resource is not protected, then access is granted to the requested resource (step 95). If the requested resource is protected, however, the method proceeds to step 54. If the user was previously authenticated for a protected resource in the same domain, a valid authentication cookie is passed by browser 12 with the request in step 50. The authentication cookie is intercepted by Web Gate 28 in step 52. If a valid cookie is received (step 54), the method attempts to authorize the user (step 56). If no valid authentication cookie is received (step 54), the method attempts to authenticate the user for the requested resource (step 60).

If the user successfully authenticates for the requested resource (step 62), then the method proceeds to step 74. Otherwise, the unsuccessful authentication is logged (step 64). After step 64, the system performs authentication failure actions and Web Gate 28 denies the user access to the requested resource (step 66). In step 74, the successful authentication of the user for the resource is logged. The method then performs authentication success actions (step 76). In response to the successful authentication, Web Gate 28 then passes a valid authentication cookie to browser 12 (step 80), which stores the cookie. After passing the cookie in step 80, the system attempts to authorize (step 56).

In step 56, the method determines whether the user is authorized to access the requested resource. If the user is authorized (step 90), the method proceeds to step 92. Otherwise, the unsuccessful authorization is logged (step 96). After step 96, the method performs authorization failure actions (step 98) and Web Gate 28 denies the user access to the requested resource. If authorization is successful (step 90), then the successful authorization of the user is logged (step 92). Authorization success actions are performed in step 94. The user is granted access to the requested resource (step 95). In one embodiment of step 95, some or all of HTTP request information is provided to the resource. In one or more scenarios, the resource being accessed is the Identity System.

More information about authorization, authentication, an Access System and an Identity System can be found in U.S. patent application Ser. No. 09/997,410, "Preparing Output XML Based on Selected Programs and XML Templates," filed on Nov. 30, 2001, which is incorporated herein by reference in its entirety.

Both the Identity System and the Access System make use of Directory 36. The basic unit of information store in Directory 36 is called an entry or profile, which is a collection of information about an object. The information in an entry often describes a real-world object such as a person, but this is not required. A typical directory includes many profiles that correspond to people, departments, groups and other objects in the organization served by the directory. A profile is composed of a set of attributes, each of which describes one particular trait of the object. Each attribute has a type, one or more values, and associated access criteria. The type describes the kind of information contained in the attribute, and the value contains the actual data.

A profile in the directory has a set of attributes that are required and a set of attributes that are allowed. For example, a profile describing a person is required to have a cn (common name) attribute and a sn (surname) attribute. One example of an allowed attribute may be a nickname. Any attribute not explicitly required or allowed is prohibited.

Examples of attributes stored in a user profile include: first name, middle name, last name, title, email address, telephone number, fax number, mobile telephone number, pager number, pager email address, identification of work facility, building number, floor number, mailing address, room number, mail stop, manager, direct reports, administrator, organization that the user works for, department number, department URL, skills, projects currently working on, past projects, home telephone, home address, birthday, previous employers and anything else desired to be stored by an administrator. Examples of attributes stored in a group profile include: owner, name, description, static members, dynamic member rule, subscription policies, etc. Examples of attributes stored in a user organization profile include: owner, name, description, business category, address, country, etc. In other embodiments, less or more than the above-listed information is stored.

Figure 3:
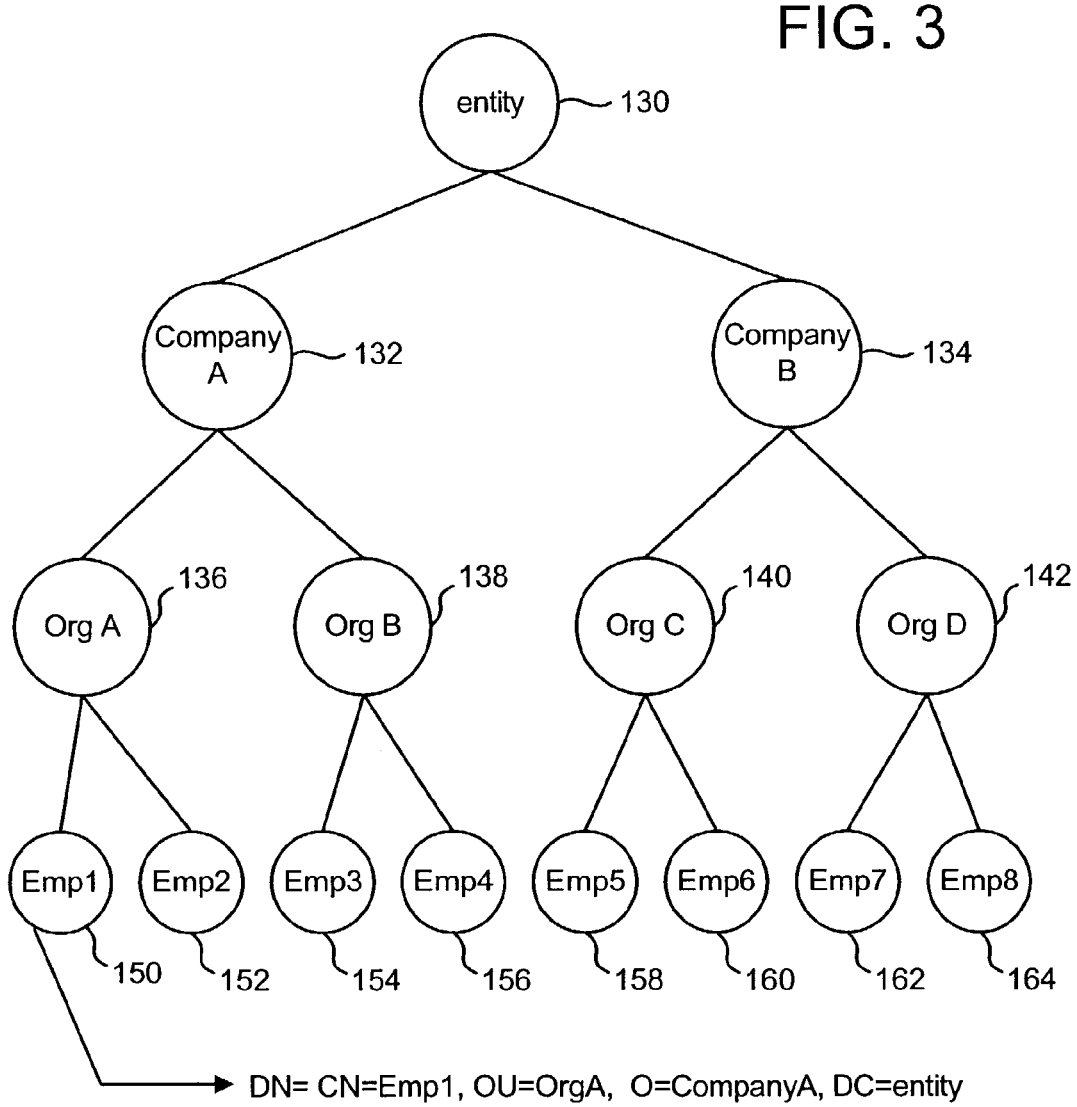
FIG. 3 is an example of a directory tree structure.

FIG. 3 depicts an exemplar directory tree that can be stored in Directory 36. Each node on the tree is an entry in the directory structure that includes an identity profile. In one embodiment, the entity can be a user, group or organization. Node 130 is the highest node on the tree and represents an entity responsible for the directory structure. In one example, an entity may set up an Extranet and grant Extranet access to many different companies. The entity setting up the Extranet is node 130. Each of the companies with Extranet access would have a node at a level below node 130. For example, company A (node 132) and company B (node 134) are directly below node 130. Each company may be broken up into organizations. The organizations could be departments in the company or logical groups to help manage the users. For example, FIG. 3 shows company A broken up into two organizations: organization A with node 136 and organization B with node 138. Company B is shown to be broken up into two organizations: organization C with node 140 and organization D with node 142. FIG. 3 shows organization A having two end users: employee 1 with node 150 and employee 2 with node 152. Organization B is shown with two end users: employee 3 with node 154 and employee 4 with node 156. Organization C is shown with two end users: employee 5 with node 158 and employee 6 with node 160. Organization D is shown with two end users: employee 7 with node 162 and employee 8 with node 164.

Each entity has a distinguished name (DN), which uniquely identifies the node. In one embodiment, each entry also has a relative name, which is different from all other relative names on the same level of the hierarchy. In one implementation, the distinguished name (DN) comprises a union of the relative names up the tree. For example, the distinguished name of employee 1 (node 150) is DN=CN=Empl, OU=OrgA, O=CompanyA, DC=entity, where:

```
DC = Domain Component
O = Organization
OU = Organizational Unit
CN = common name.
```

FIG. 3 shows a hierarchical tree. Some organizations employ fat or flat trees for ease of maintenance. A flat directory tree is a directory information tree that does not have any hierarchy. All of the nodes are leaf nodes (nodes without any child nodes). A fat directory tree is a tree that has a large number of nodes at any given level in a directory information tree. One advantage of a fat or flat tree is user maintenance. For example, if an employee moves to a new group, the node must be moved to a new container if the tree is not flat or fat. By moving the node to a new container, the distinguished name for the node changes and all certificates become void. One drawback of flat or fat trees is that the organization loses the benefits of having a logical directory, such as using the logical directory to determine who has access to which nodes. To remedy this, the Identity System includes partition support for fat and flat tree directories using filters. From a configuration page, an attribute can be configured to be accessible (read, modify, etc.,) based on a two part filter. The first component in the filter identifies a top node in the directory. The filter will only apply to those entities at or below that top node. The second component of the filter is an LDAP filter which defines who can access the attribute. This two component filter can be applied on an attribute by attribute basis.

There are many ways for an entity to access and use the Identity System. In one embodiment, the entity can access the Identity System's services using a browser. In other embodiments, XML documents and API's can be used to access the services of the Identity System. For example, an entity can use a browser by pointing the browser to Identity Server 40. The user will then be provided with a login page to enter the user's ID, password, type of user and application requested (optional). Upon filling out that information, the user will be authenticated and authorized (by the Access System) to use the Identity System. Alternatively, the Access System can be bypassed (or there may be no Access System) and the Identity System authenticates the user.

As described above, the Identity System of FIG. 1 includes User Manager 42, Group Manager 44 and Organization Manager 46. User Manager 42 manages identity profiles for users. Group Manager 44 manages identity profiles for groups. Organization Manager 46 manages identity profiles for organizations. Each of these components will now be described in more detail.

Figure 4:
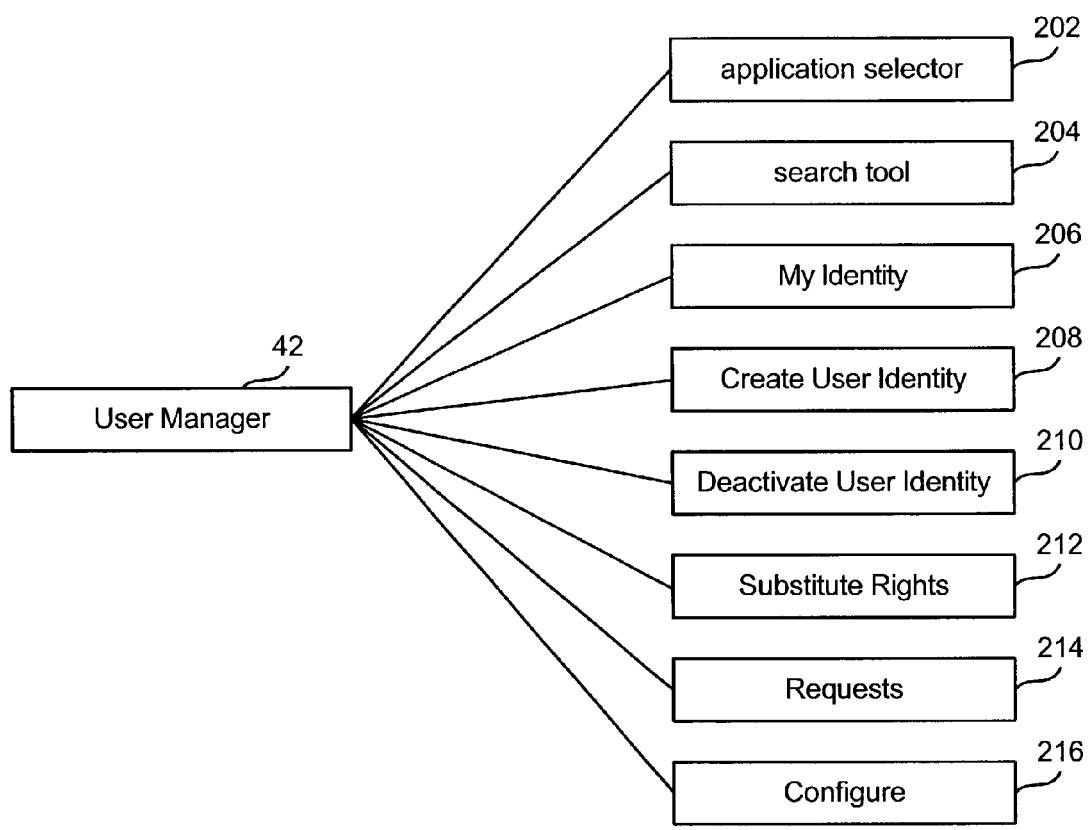
FIG. 4 is a block diagram depicting the User Manager.

FIG. 4 graphically depicts the various services provided by User Manager 42. Each of these services can be accessed from a User Manager home page. For example, in one embodiment, the home page will include application selector 202, search tool 204, My Identity tab 206, Create User Identity tab 208, Deactivate User Identity tab 210, Substitute Rights tab 212, Requests tab 214 and Configure tab 216. Application selector 202 lets the user change applications from the User Manager to either the Group Manager, Object Manager, or Publisher. In one embodiment, application selector 202 is a drop down menu. Search tool 204 enables a user to provide search information in order to search the directory for a set of one or more user identity profiles.

By selecting My Identity tab 206, a user is provided with the information stored in that user's identity profile. Create User Identity tab 208 allows a user with the appropriate privileges to create a new user identity profile (e.g. with a workflow). Deactivate User Identity tab 210 allows a user with proper privileges to remove an identity profile from the directory. Substitute Rights tab 212 allows the user to indicate who can proxy that user and allows the user to be a proxy for someone else. Request tab 214 allows a user to monitor workflows that are in progress or recently completed. Depending on the user's privileges, by selecting request tab 214, the user can see all workflows that involve that user, that are started by that user, that affect that user or that the user has privileges to view. Request tab 214 will indicate workflows for which there is an outstanding action to be done by the current user. The user can select that workflow and perform the task.

Configure tab 216 allows a user to configure various options for User Manger 42. The user must have sufficient privileges to access Configure tab 216. The user can perform attribute access control, delegate administration, define workflows and set the search base. Attribute access control includes controlling who has view and modify permissions for each attribute. Attributes can be set at any and all levels in an organization. The configuration also allows the specification of an e-mail notification list when a change to an attribute is requested. Delegation administration includes delegating administrative tasks to local administrators. An entity can choose what rights to delegate, whom to delegate to, and the scope to delegate. Workflow definition includes defining workflows for a particular organization, defining who will be responsible for the workflow actions and/or defining who will be receiving notifications for the workflow actions. Setting the search base includes setting the search base for a particular organization, person or set of persons. This will localize access to ensure security.

FIG. 5 depicts the various services provided by Group Manager 44. Once an entity is at the Group Manager home page, the entity can access application selector 230, search tool 232, My Groups tab 234, Create Groups tab 236, Request tab 238, Manage Subscriptions tab 239, Configure tab 240, and Manage Members tab 241. My Groups tab 234 indicates the groups of which the entity is a member. By selecting any of the groups identified by My Groups tab 234 or Search Tool 232, the user will be provided with the identity profile page for that particular group. From the profile page, the group can be modified or deleted. Create groups tab 236 allows the user to create a new group. Request tab 238 provides the user with access to currently pending and recently finished workflows that involve groups. Configure tab 240 allows the user to configure various information about groups in the Group Manager. While viewing the identity profile for a group, the entity can modify that profile if the entity has appropriate privileges.

Configure tab 240 allows an entity to provide attribute access control, delegate rights, define workflows and expand dynamic groups. Attribute access control includes controlling who has view and modify permissions for each attribute in group identity profiles. Additionally, e-mail notification lists can be created which are used to notify entities when a change to an attribute is requested. Administration tasks can be delegated to local administrators. An entity can choose what rights to delegate, who to delegate to, and what the scope of the delegation is. Workflow definition includes defining the workflows for a particular group. This includes defining who is responsible for the workflow actions and who will be receiving notifications for workflow actions. Note that some of the tabs and services may not be available to all entities, depending upon the privileges of those entities. Manage Subscriptions tab 239 allows users to subscribe to groups or unsubscribe from groups. Manage Members tab 241 allows users to view, add, remove, and search members of a group.

FIG. 6 depicts the services provided by Organization Manager 46. Organization manager 46 provides functionality to create, modify, delete and manage organizational objects. From the home page for Organization Manager 46, a user is provided with application selector 242, search tool 244, Create Organizational Profile tab 246, Request tab 248 and Configure tab 250. Application selector 242 allows the user to select a different application to access. Search tool 244 provides a user with the ability to enter search terms in order to search for one or more organizational objects. After performing a search, the user will be provided with a list of organizational objects meeting the search requirements. User can select any of these objects to view, modify or delete, if the user has sufficient privileges.

Create Organizational Profile tab 246 allows a user to create new organizational objects, if the user has sufficient privileges. Request tab 248 allows a user to access pending workflows and workflows that have recently been finished that relate to organizational objects. Access to Request tab 248 can be restricted and/or limited depending upon users privileges. If a user has a step to perform for a workflow, it will be indicated by Request tab 248.

Configure tab 250 allows the entity to perform attribute access control, delegate administration, define workflows and define container limits. Attribute access control includes controlling who has view and modify permissions for each attribute of an organizational identity profile. In addition, an entity can specify an e-mail notification list when a change to an attribute is requested. Delegating administration includes delegating administrative tasks to local administrators. An entity can choose what rights to delegate, whom to delegate to, and the scope of the delegation. Workflow definition includes defining the workflows for a particular organization, including who will be responsible for the workflow actions and who will be receiving notifications for the workflow. Container limits includes controlling how many objects can be created in an organization. This would also include defining who will be receiving notifications that a container limit has been met, has been violated or is close to being met.

Figure 7:
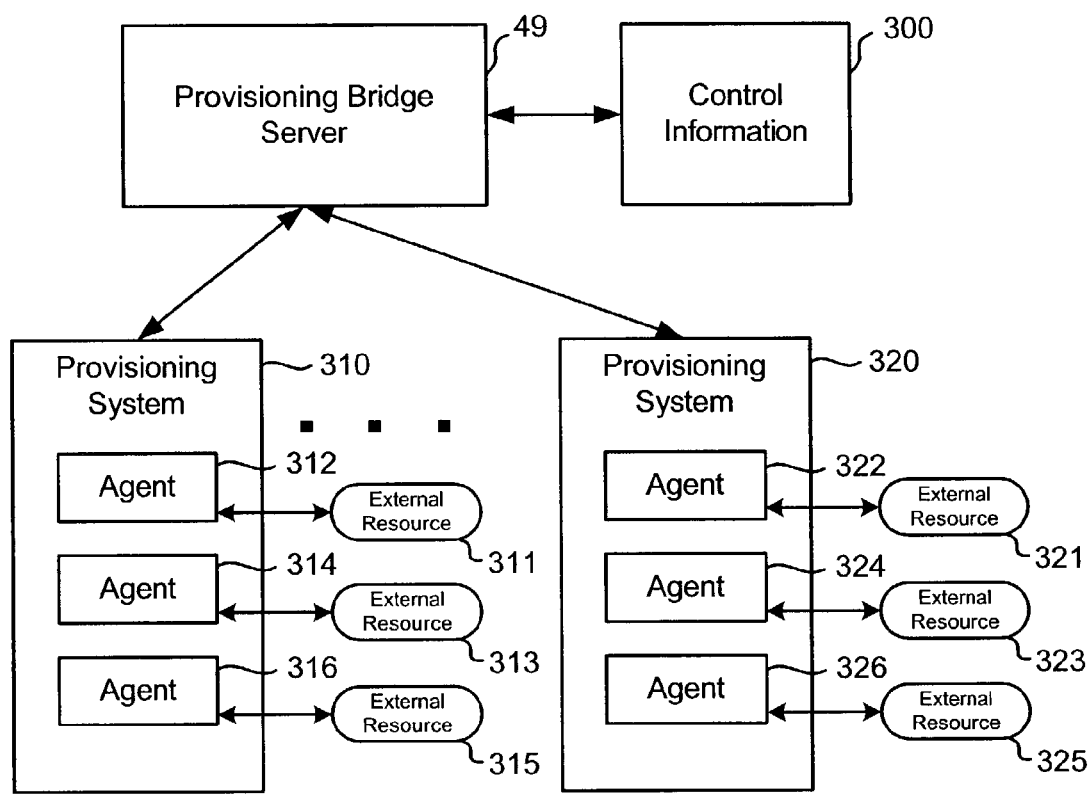
FIG. 7 is a block diagram of one embodiment of a provisioning bridge server in communication with multiple provisioning systems.

FIG. 7 depicts a block diagram of Provisioning Bridge Server 49 in operation. Provisioning Bridge Server 49 is in communication with control information 300 and a set of provisioning systems, including provisioning systems 310 and 320. In one embodiment, control information 300 is maintained in Directory Server 36. In another embodiment, control information 300 is maintained in a memory separate from Directory Server 36. Provisioning systems 310 and 320 are external to the Identity System in one implementation. In one such implementation, provisioning systems 310 and 320 communicate with Provisioning Bridge Server 49 through a communications link, such as a local area network or wide area network connection. Those skilled in the art recognize that many different types of communication mediums are suitable for facilitating communication between Provisioning Bridge Server 49 and provisioning systems 310 and 320. In another implementation, functionality may be included within the Identity System to perform the operation of a provisioning system.

Provisioning system 310 includes agents 312, 314, and 316. Provisioning system 320 includes agents 322, 324, and 326. Provisioning systems 310 and 320 receive requests from Provisioning Bridge Server 49 to allocate or eliminate access to external resources for entities managed by the Identity System, such as users. Examples of external resources include applications and operating systems on computer systems and telephone connections. Provisioning systems 310 and 320 delegate each request they receive to an agent that is adapted to interface with the requested resource. Provisioning system 310 may allocate a task to agent 312, 314, or 316. Provisioning system 320 may allocate a task to agent 322, 324, or 326. As shown in FIG. 7, agents 312, 314, and 316 support external resources 311, 313, and 315, respectively. Agents 322, 324, and 326 support external resources 321, 323, and 325, respectively.

Multiple provisioning systems may be required to support all of the resources employed by the Identity System's entities. For example, provisioning system 310 may only have agents that interface with engineering related external resources, and provisioning system 320 may only have agents that interface with marketing related external resources. In one example, provisioning system 310 employs agents 312, 314, and 316 to provide and remove access to engineering related resources 311, 313, and 315. Provisioning system 320 employs agents 322, 324, and 326 to provide and remove access to marketing related external resources 321, 323, and 325.

Provisioning Bridge Server 49 facilitates the Identity System's automated use of multiple provisioning systems 310 and 320. Provisioning Bridge Server 49 maintains control information 300, which correlates the external resources used by Identity System entities with the various provisioning systems. During operation the Identity System may need to have a resource related task performed, such as providing an entity with access to a resource or eliminating an entity's access to a resource. Provisioning Bridge Server 49 identifies the proper provisioning system for performing the resource related task and submits a request to the proper provisioning system to perform the task. Provisioning Bridge Server 49 employs control information 300 to identify the proper provisioning system for performing the desired task.

In one implementation, control information 300 includes entries with the following fields: 1) Job Code—identifying a classification assigned to an entity in the Identity System based on the entity's role in one or more organizations; 2) Target—identifying an external resource corresponding to the Job Code; 3) Type—identifying a type of service the Target resource provides for the Job Code; 4) Approval—indicating whether approval is required to provide or eliminate access to the resource Target and Type for the Job Code; and 5) PS—identifying the provisioning system that supports the resource Target and Type. This only provides one example of fields for control information 300. Alternate embodiments of control information 300 may include numerous other configurations that correlate job codes, external resources, and provisioning systems.

Table 1 below shows one example of content in control information 300 having the fields described above:

TABLE 1

| Job Code | Target | Type | Approval | PS |
|---|---|---|---|---|
| A | System 1 | Engineering Applications | Yes | Provisioning System 510 |
| A | System 2 | E-mail | Yes | Provisioning System 520 |
| B | Syste, 3 | Marketing Applications | Yes | Provisioning System 520 |
| A | System 1 | Legal Applications | No | Provisioning System 510 |

Table 1 shows that Provisioning Bridge Server 49 needs to arrange for entities with Job Code A to receive the following: 1) accounts on computer system 1 for performing legal applications and engineering applications, and 2) an account on computer system 2 to perform e-mail applications. Approval must be obtained before gaining access to the engineering applications and e-mail. Provisioning Bridge Server 49 goes through provisioning system 310 for the engineering and legal applications and provisioning system 320 for the e-mail. Entities with Job Code B receive accounts for performing marketing applications on computer system 3 after obtaining approval. Provisioning Bridge Server 49 goes through provisioning system 320 for the marketing applications. Engineering applications may include design and simulation software among other things. Marketing applications may include inventory and order tracking software among other things. Legal applications may include docketing software among other things. In the example from Table 1, Job Code A could be assigned to an entity with a role related to engineering and legal groups within an organization. Job Code B could be assigned to an entity with a role related to a marketing group within an organization.

By employing job codes, the Identity System can provide entities, such as users, with a label that corresponds to the external resources the entity needs. The Identity System can assign job codes to an entity based on the role the entity plays in the organization managed by the Identity System. In one implementation the Identity System sets job codes for an entity based on the groups to which the entity belongs. In one embodiment, the Identity System associates a job code attribute with an entity to identify all of the entity's job codes. In some instances, an entity may have multiple job codes nested within the job code attribute.

Figure 8:
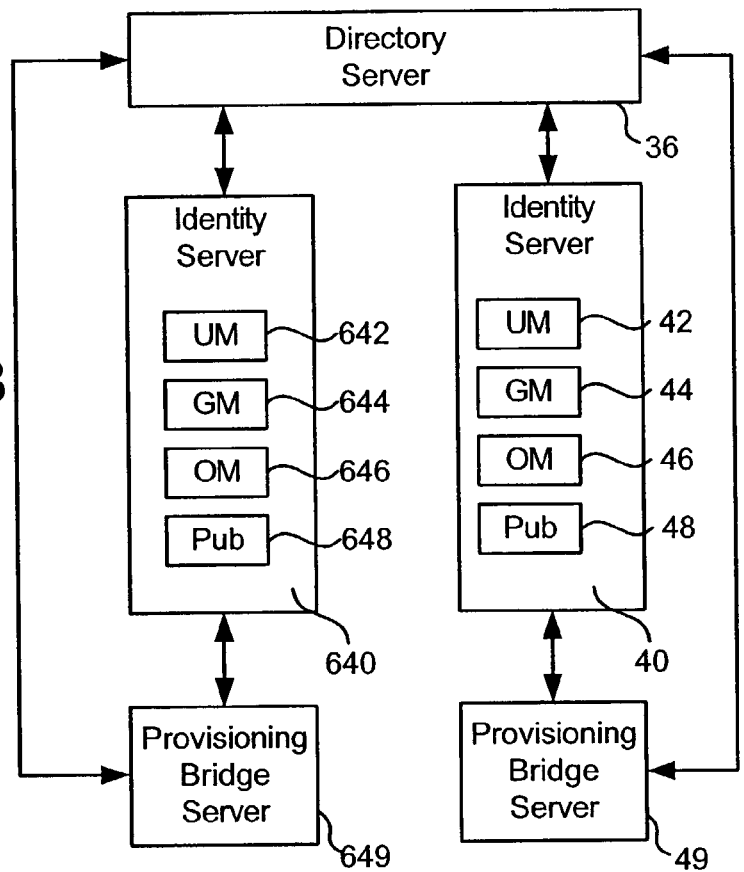
FIG. 8 is a block diagram depicting one embodiment of multiple identity servers and provisioning bridge servers in communication with a directory server.

FIG. 8 shows a portion of an Identity System that includes two Identity Servers and two Provisioning Bridge Servers. Identity Servers 40 and 640 and Provisioning Bridge Servers 649 and 49 are coupled to Directory Server 36. Identity Server 640 includes User Manager 642, Group Manager 644, Organization Manager 646, and Publisher 648—each operating the same as the corresponding applications described for Identity Server 40. Provisioning Bridge Server 649 operates the same as Provisioning Bridge Server 49.

In operation, a combination of Identity Servers 640 and 40 and Provisioning Bridge Servers may want to access the same information in Directory Server 36 at the same time. This can occur during resource provisioning. Multiple entities competing for access to the same information in Directory Server 36 can also occur in many different operations of the Identity System and Access System.

As described above, provisioning provides for the assignment or removal of resources associated with a user or another entity. In one embodiment, provisioning requests are maintained in a queue in the Identity System and processed by multiple Provisioning Bridge Servers, such as Servers 49 and 649. When no mechanism is provided to manage common access attempts to Directory Server information, multiple Provisioning Bridge Servers may attempt to service the same queue entries—potentially overriding or corrupting provisioning performed by one of the Provisioning Bridge Servers.

Figure 9:
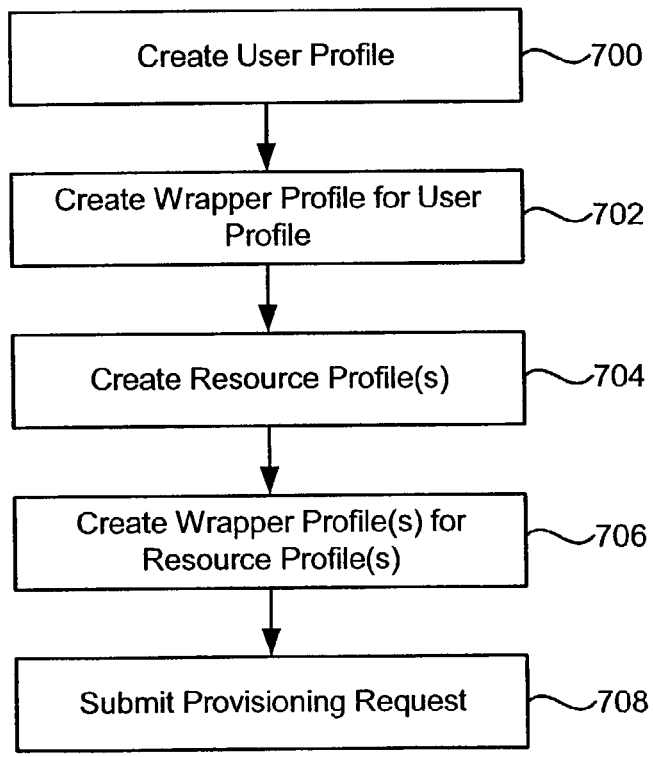
FIG. 9 is a flowchart describing one embodiment of a process for employing wrapper profiles for use in provisioning.

FIG. 9 shows one embodiment of a process for managing the access of profiles in Directory Server 36 to avoid simultaneous accesses of profiles undergoing provisioning. In one example, resources may need to be provisioned to a user, which is represented in the Identity System by a user profile. FIG. 9 shows the creation of the user profile (step 700) and the creation of a wrapper profile that corresponds to the user profile (step 702). The wrapper profile indicates whether the user profile can be accessed. The wrapper profile is maintained as a profile in Directory Server 36. In one embodiment, User Manager 42 creates the user profile and Organization Manager 46 creates the wrapper profile as part of one or more workflows related to user creation or modification. Workflows are explained in greater detail below. In alternate embodiments, different applications or entities can create the wrapper profile as part of a workflow or other process.

A wrapper profile includes attributes that relate to managing access of another profile. The state of one or more attributes in a wrapper profile indicate whether the corresponding profile is accessible. Greater detail regarding the format of a wrapper profile will be provided below. In one embodiment, a wrapper profile includes the following attributes: (1) Name—identifying the name for the wrapper profile; (2) Status Name—identifying the distinguished name for the wrapper profile; (3) Locking Status—identifying the accessibility of the profile corresponding to the wrapper profile; (4) Component Identifier—identifying a component or application that has set the Locking Status of the wrapper profile; (5) Current Time Stamp—identifying the time the Locking Status was last set for the wrapper profile; (6) Protected Identity Object DN—identifying the corresponding profile that has accessibility managed by the wrapper profile; and (7) Protected Identity Attribute—identifying at least one attribute in the profile identified by the Protected Identity Object DN that is locked. In an alternate embodiment, different attributes can be employed in a wrapper profile.

The following provides an example of Organization Manager 46 creating a wrapper profile that corresponds to a user profile. Organization Manager 46 sets the Name attribute in the wrapper profile to identify the wrapper profile's name. Organization Manager 46 sets the Status Name attribute to the wrapper profile's distinguished name. Organization Manager 46 sets the Locking Status attribute to a desired value.

In one implementation, the possible Locking Status values are as follows: 1) locked—preventing any other entity from accessing the corresponding user profile; 2) shared—allowing other entities to access the user profile to read information; and 3) not locked—allowing any entity to access the user profile for reading or writing information. In alternate embodiments, different Locking Status attribute values can be set.

Organization Manager 46 sets the Component Identifier attribute value to identify Identity Server 40 in one embodiment. In alternate embodiments, Organization Manager 46 or Provisioning Bridge 49 is identified in the Component Identifier attribute. Organization Manager 46 also sets the Current Time Stamp attribute to the current time.

Organization Manager 46 sets the Protected Identity Object DN attribute to the distinguished name for the user profile. Organization Manager 46 sets the Protected Identity Attribute to identify attributes in the user profile. In one embodiment, the identified user profile attributes are relevant to a task to be performed while the user profile is locked.

Once a wrapper profile is created for the user profile (step 702, FIG. 9), Organization Manager 46 creates a resource profile for each type of resource being provisioned to the user (step 704). In alternate embodiments, a resource profile is not created for each resource. Instead, a resource profile corresponds to multiple resources for provisioning. Organization Manager 46 also creates wrapper profiles for each resource profile created in step 704 (step 706). Organization Manager 46 then submits a provisioning request that calls for provisioning the resources that correspond to the created resource profiles created in step 704 (step 708). In one embodiment, Organization Manager 46 knows which resource profiles to create based on a configuration file existing in the Identity System. In alternate embodiments, inputs to a workflow inform Organization Manager 46 which resources need to be created. In further embodiments, a job code attribute in the user profile identifies the necessary resource provisioning. In further embodiments, different applications perform the operating steps described above for Organization Manager 46.

Figure 10:
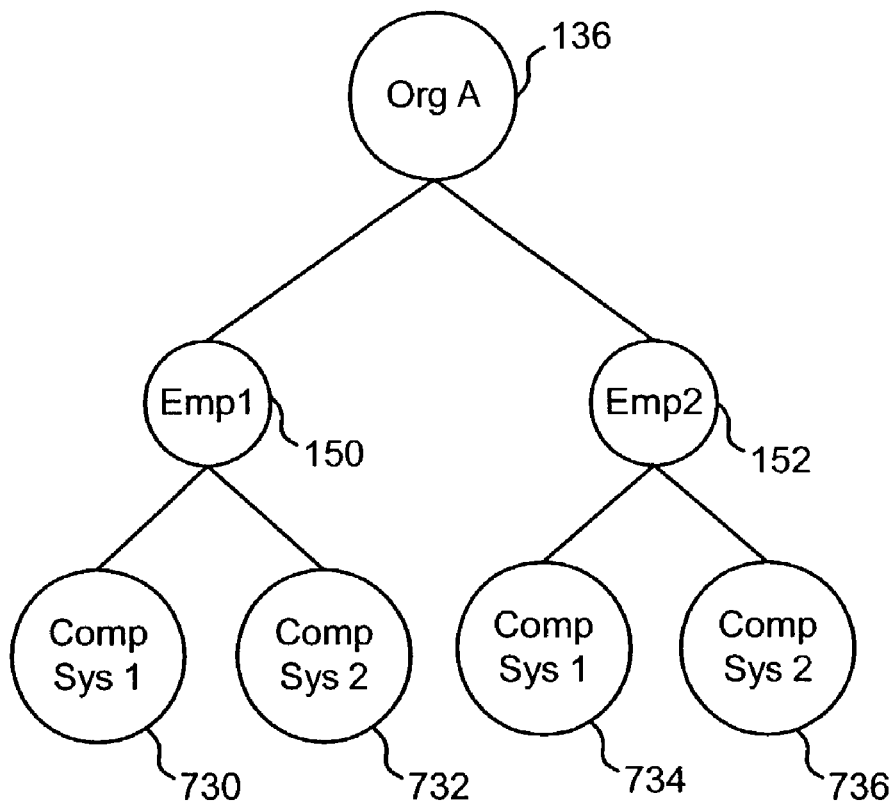
FIG. 10 is one example of a portion of a directory tree with user and resource profiles.

FIG. 10 illustrates one example of a set of user profiles and resource profiles created in Directory Server 36 by performing the process shown in FIG. 9. As described earlier in FIG. 3, the Organization A node 136 is an organization profile. Employee 1 node 150 and Employee 2 node 152 are user profiles created as part of step 700 in FIG. 9. Resource node 730 is a resource profile with at least one attribute that corresponds to an account Employee 1 needs on Computer System 1. Resource profile 732 has at least one attribute that corresponds to an account Employee 1 needs on Computer System 2. Resource profile 734 has at least one attribute that corresponds to an account Employee 2 needs on Computer System 1. Resource profile 736 has at least one attribute that corresponds to an account Employee 2 needs on Computer System 2. Resource profiles 730, 732, 734, and 736 are created in step 704 of the process in FIG. 9.

Figure 11:
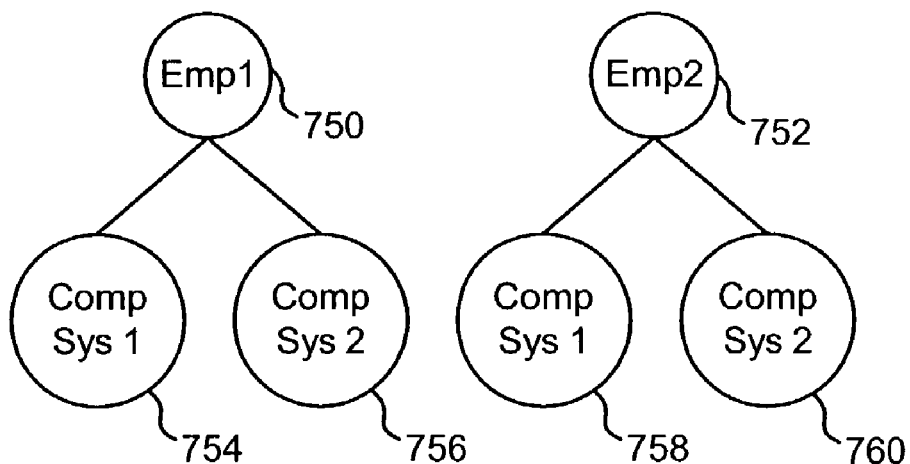
FIG. 11 is one example of wrapper profiles that correspond to the user and resource profiles in FIG. 10.

FIG. 11 illustrates wrapper profiles created for the user and resource profiles in FIG. 10 during steps 702 and 706 of the process in FIG. 9. Wrapper profile 750 corresponds to user profile 150 for Employee 1. Wrapper profile 754 corresponds to resource profile 730 for Employee 1's account on Computer System 1. Wrapper profile 756 corresponds to resource profile 732 for Employee 1's account on Computer System 2. Wrapper profile 752 corresponds to the user profile 152 for Employee 2. Wrapper profile 758 corresponds to resource profile 734 for Employee 2's account on Computer System 1. Wrapper profile 760 corresponds to resource profile 736 for Employee 2's account on Computer System 2. For each wrapper profile in one implementation of FIG. 11, the Protected Identity Object DN attribute includes the distinguished name for the corresponding user or resource profile. In an alternate embodiment, Organization Manager 46 only creates wrapper profiles that correspond to user profiles. In such an embodiment, a wrapper profile corresponding to a user profile controls the accessibility of all resource profiles that correspond to the user profile.

Figure 12:
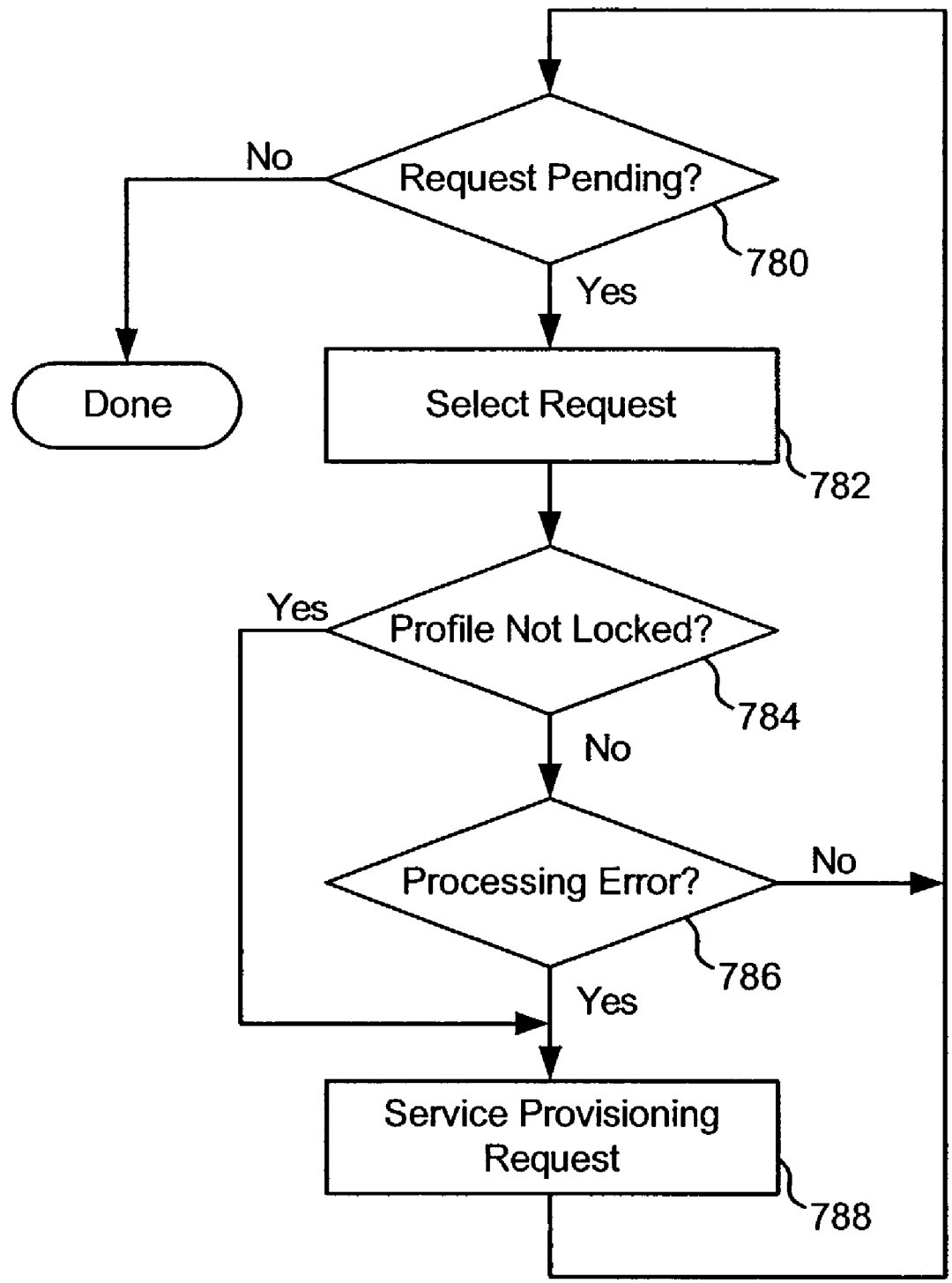
FIG. 12 is a flowchart describing one embodiment of a process for retrieving and servicing provisioning requests.

FIG. 12 illustrates one embodiment of a process for responding to requests for provisioning, such as those generated in step 708 of FIG. 9. The process shown in FIG. 12 is performed by each Provisioning Bridge Server in the Identity System, such as Provisioning Bridge Servers 49 and 649 in FIG. 8. The process shown in FIG. 12 avoids Provisioning Bridge Servers 49 and 649 servicing the same provisioning request.

In one implementation, Provisioning Bridge Servers 49 and 649 each select provisioning requests from a queue maintained by the Identity System. In one implementation, the Organization Managers in each Identity Server maintain a single provisioning request. In one embodiment, each queue entry includes the following fields: (1) Status Name—identifying the distinguished name of the wrapper profile for the user profile that corresponds to the resources being provisioned; (2) Component Identifier—providing the value from a Component Identifier attribute in the wrapper profile identified in the Status Name field; and (3) Locking Status—identifying the value of the Locking Status attribute in the wrapper profile identified in the Status Name field. In this embodiment, the request only identifies wrapper profiles that correspond to user profiles.

The Provisioning Bridge Server is aware of the corresponding resource profiles based on information in a configuration file maintained in the Identity System. Alternatively, the resource profiles can be provided to a Provisioning Bridge Server in a number of different ways. The wrapper for the user profile can have attributes identifying the resource profiles for the user. A workflow employed in modifying the user profile and calling for provisioning can provide the distinguished names for the resource profiles. Many other methods can be used for providing the corresponding resource profiles to the Provisioning Bridge Server.

As shown in FIG. 12, Provisioning Bridge Server 49 determines whether a provisioning request is pending (step 780). In one implementation, Provisioning Bridge Server 49 makes this determination by looking at the provisioning request queue maintained by the Organization Manager(s). If no requests are pending, Provisioning Bridge Server 49 remains idle and is done with processing for the moment.

If provisioning requests are pending, Provisioning Bridge Server 49 selects a provisioning request (step 782). The Provisioning Bridge Server 49 determines whether the user profile associated with the provisioning request is locked (step 784). In order to make this determination, Provisioning Bridge Server 49 identifies and accesses the wrapper profile associated with the user profile. Provisioning Bridge Server 49 looks at the Status Name field in the provisioning request to identify the distinguished name of the wrapper for the user profile. Provisioning Bridge Server 49 looks to the Locking Status attribute in the wrapper profile to determine whether the user profile is locked. If the Locking Status is not locked, Provisioning Bridge Server 49 proceeds to service the provision request (step 788). Otherwise, Provisioning Bridge Server 49 determines whether the user profile has encountered a processing error (step 786). In alternate embodiments, no attempt is made to identify processing errors.

In order to identify and access the wrapper profile corresponding to the user profile in step 784, Provisioning Bridge Server 49 employs a Lightweight Directory Access Protocol ("LDAP") search in one embodiment. In the LDAP search, Provisioning Bridge Server 49 queries Directory Server 36 for a wrapper profile that satisfies the following criteria: 1) a distinguished name that appears in the Status Name field of the provisioning request; and 2) a Locking Status attribute with a not locked value. If the search is successful, Provisioning Bridge Server 49 is said to have determined that the user profile is not locked. If the search is not successful, Provisioning Bridge Server 49 is said to have not determined that the profile is not locked. In an alternate embodiment, Provisioning Bridge Server 49 queries the provisioning request queue maintained by the Organization Manager(s) to identify the Locking Status of the wrapper profile identified in the provisioning request. This status informs Provisioning Bridge Server 49 of whether the user profile is not locked, locked, or shared.

Figure 13:
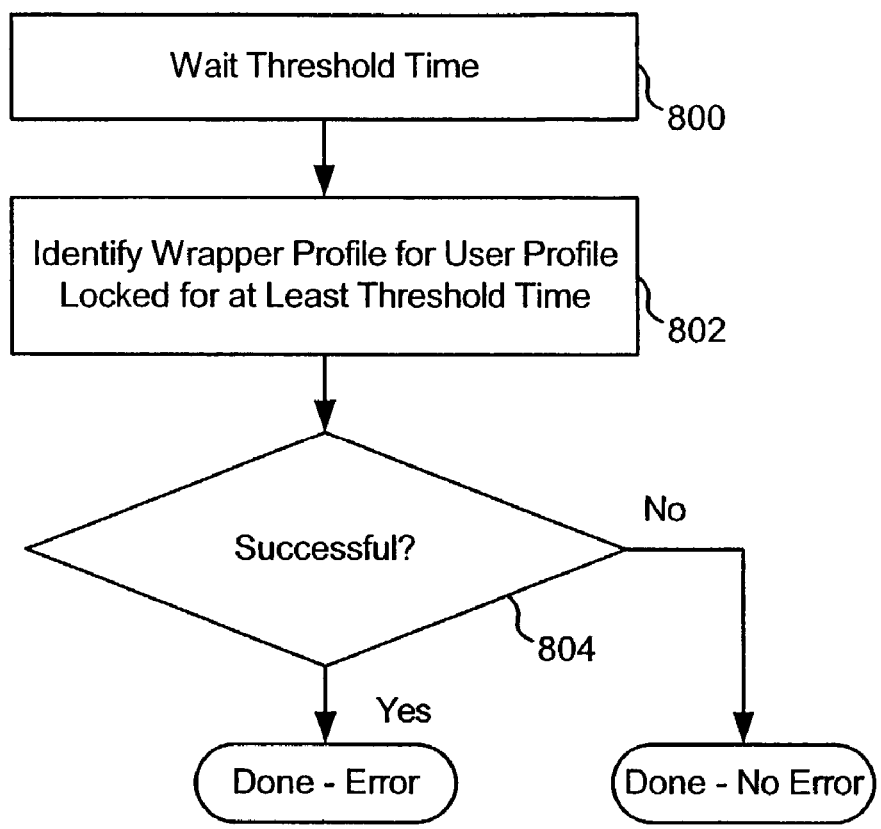
FIG. 13 is a flowchart describing one embodiment of a process for determining whether a profile underwent a processing error.

FIG. 13 shows one embodiment of a process for determining whether the user profile has undergone a processing error (step 786, FIG. 12). In the embodiment shown in FIG. 13, the processing error being detected is the user profile being locked for an excessive period of time—possibly indicating that the entity that initially locked the user profile has crashed without completing its processing. In alternate embodiments, different types of errors can be evaluated.

Provisioning Bridge Server 49 waits for a threshold period of time (step 800). In one embodiment, the threshold period of time is longer than the time needed to perform any Access System or Identity System operation while the user profile is locked. In one implementation, the threshold period of time is twice as long as the maximum potential time period for a profile to be locked. Next, Provisioning Bridge Server 49 attempts to identify a wrapper profile that meets the following criteria: (1) a distinguished name matching the one provided in the Status Name field of the provisioning request; (2) a Locking Status attribute value of locked; and (3) a Current Time Stamp attribute value that is less than the current time by at least the threshold period of time (step 802). If Provisioning Bridge Server 49 is successful in finding such a wrapper profile, an error is detected. Otherwise, no error exists.

In order to identify a wrapper profile meeting the above criteria in one embodiment, Provisioning Bridge Server 49 performs an LDAP search for a wrapper that meets the above-listed criteria. In alternate embodiments, protocols other than LDAP may be employed to make the error determination. In still further embodiments, Provisioning Bridge Server 49 limits the wrapper profile search to a wrapper meeting the above-described criteria and having a Component Identifier attribute value that corresponds to an entity other than Organization Manager 46 or Identity Server 40. This limitation reflects the fact that the crashed Identity Server, Organization Manager, or Provisioning Bridge Server is most likely not the Identity Server or Provisioning Bridge Server carrying out the current operations.

Figure 14:
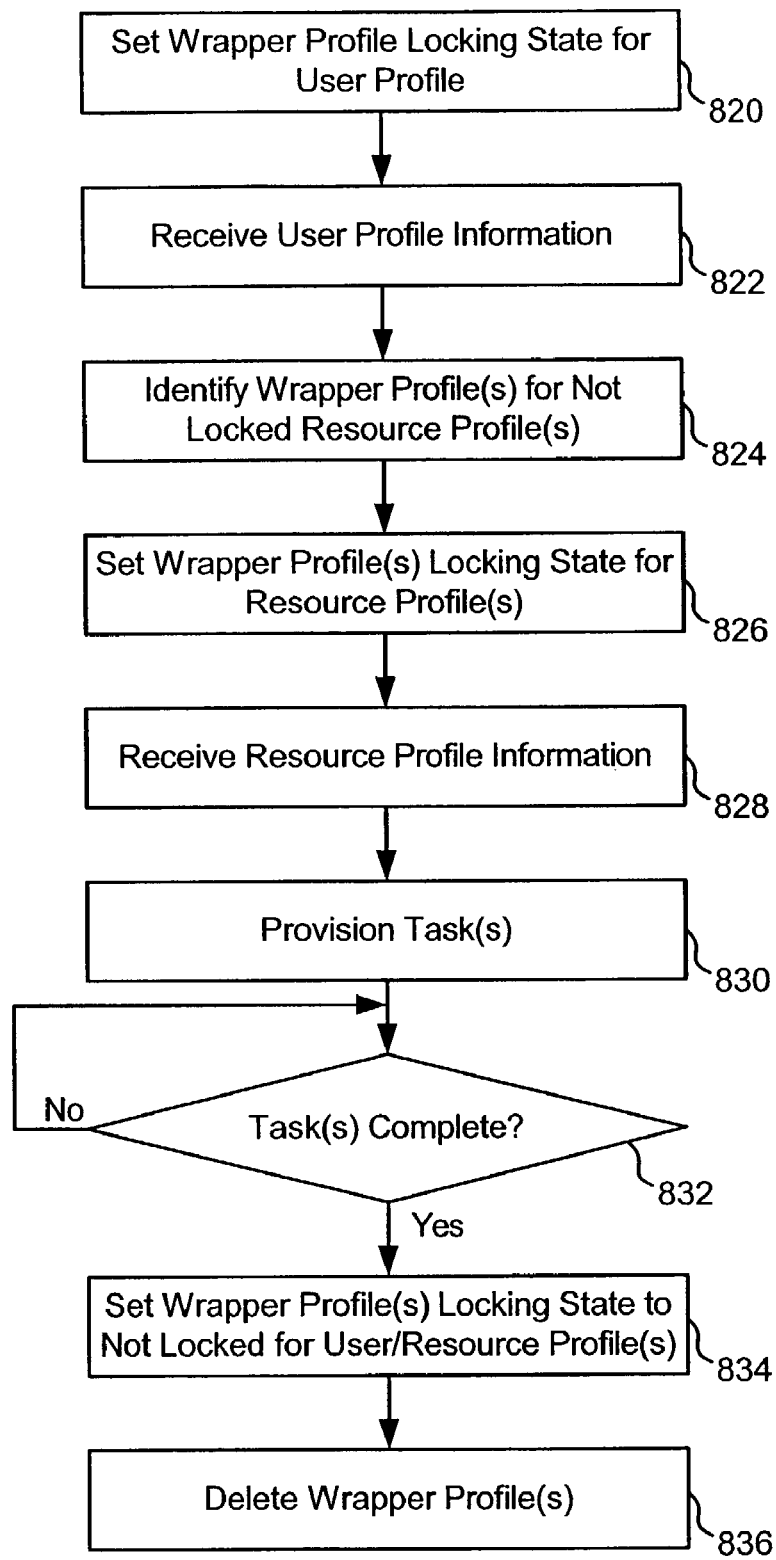
FIG. 14 is a flowchart describing one embodiment of a process for servicing a provisioning request.

FIG. 14 illustrates one embodiment of a process for servicing a provisioning request (step 788, FIG. 12). Provisioning Bridge Server 49 locks the user profile by setting the locking state of the corresponding wrapper profile (step 820). In one embodiment, the wrapper profile has three possible locking states, as described above: 1) locked; 2) not locked; and 3) shared.

Figure 15:
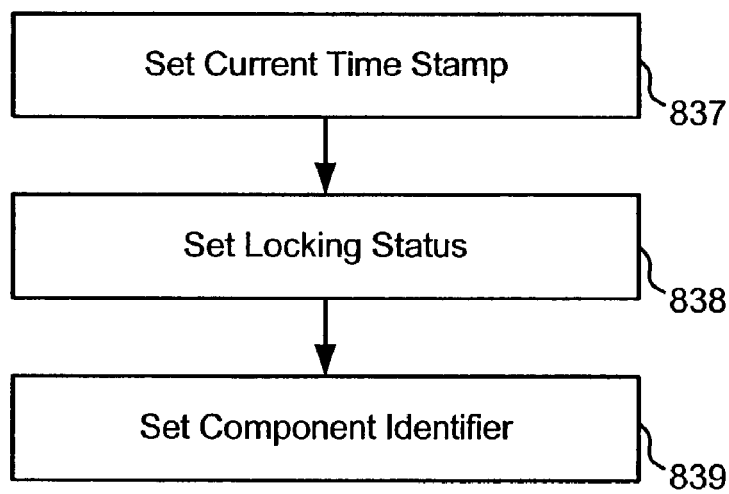
FIG. 15 is a flowchart describing one embodiment of a process for setting a locking state of a wrapper profile.

FIG. 15 provides one example of how the locking state of a wrapper profile is set. An entity such as Provisioning Bridge Server 49 sets the Current Time Stamp attribute in the wrapper profile to the current time (step 837). Provisioning Bridge Server 49 then sets the Locking Status attribute in the wrapper profile to the desired value. In one embodiment, the options are locked, not locked, and shared. Provisioning Bridge Server 49 also sets the Component Identifier attribute to a value that corresponds to the entity accessing the wrapper for the purpose of modifying the Locking Status (step 839). In one implementation, the Component Identifier is set to a value that corresponds to the Identity Server associated with the entity accessing the wrapper profile. For example, when Provisioning Bridge Server 49 accesses the wrapper profile, the Component Identifier attribute is set to a value that corresponds to Identity Server 40. In an alternate embodiment, setting the wrapper profile's locking state is achieved by setting the wrapper profile's Locking Status attribute value.

Returning to FIG. 14, Provisioning Bridge Server 49 receives user profile information (step 822). This information is received in response to identifying and accessing the wrapper profile, such as through an LDAP search in one embodiment. The user profile information returned in one implementation is the information maintained in the wrapper profile's Protected Identity Attribute attribute and Protected Identity Object DN attribute. This informs Provisioning Bridge Server 49 of the user profile that corresponds to the wrapper and the attributes in the user profile that are relevant to the provisioning task requested. In further embodiments, different information may be returned. In one embodiment, returned user profile information also includes an identification of resource profiles that correspond to the user profile and require processing as part of the provisioning request.

Provisioning Bridge Server 49 identifies wrapper profiles for each of the resource profiles associated with the user profile (step 824). Provisioning Bridge Server 49 uses an LDAP search to make this identification in one embodiment. Provisioning Bridge Server 49 searches for wrapper profiles in Directory Server 36 that meet the following criteria: 1) a Protected Identity Object DN attribute value that matches the distinguished name for a resource profile; and 2) a Locking Status attribute value of not locked. Methods other than an LDAP search can be employed. In alternate embodiments, Provisioning Bridge Server 49 searches for all wrapper profiles that correspond to the resource profiles, regardless of whether the wrapper profiles have a not locked Locking Status. Provisioning Bridge Server 49 then performs error processing detection as described above for wrapper profiles that do not have a not locked status.

For each wrapper profile identified in step 824, Provisioning Bridge Server 49 sets the wrapper profile's locking state to locked (step 826). Provisioning Bridge Server 49 then proceeds to receive resource profile information from the identified and locked wrapper profiles (step 828). In one embodiment, the information received includes attribute values that relate to the resources being provisioned. In further embodiments, no resource profile information is received.

Provisioning Bridge Server 49 provisions the tasks associated with the provisioning requests (step 830) and waits for all provisioning tasks to be completed (step 832). Further details regarding provisioning will be provided below. Once the provision tasks are completed, Provisioning Bridge Server 49 unlocks the wrapper profiles associated with the user profile and resource profiles (step 834). In one embodiment, Provisioning Bridge Server 49 unlocks each user and resource profile by setting the corresponding wrapper profile's locking state to not locked—setting the Locking Status for each of the wrapper profiles to not locked. If the wrapper profiles are no longer needed, Provisioning Bridge Server 49 proceeds to delete the wrapper profiles (step 836). For example, if no more resource provisioning is anticipated for the user until another user modification workflow is executed, then there is no need for the wrapper profiles. In one embodiment, the unlocking step of 834 is not performed if wrapper profiles are to be deleted in step 836. The deletion serves as unlocking the user and resource profiles. In implementations where wrapper profiles are not deleted, unlocking user and resource profiles is carried out by changing the Locking Status within a wrapper profile.

Although embodiments of the present invention have been described above with respect to provisioning, many different processes within an Identity System, Access System, or integrated identity/Access System may employ the use of wrapper profiles to manage simultaneous access attempts of information in Directory Server 36.

Figure 16:
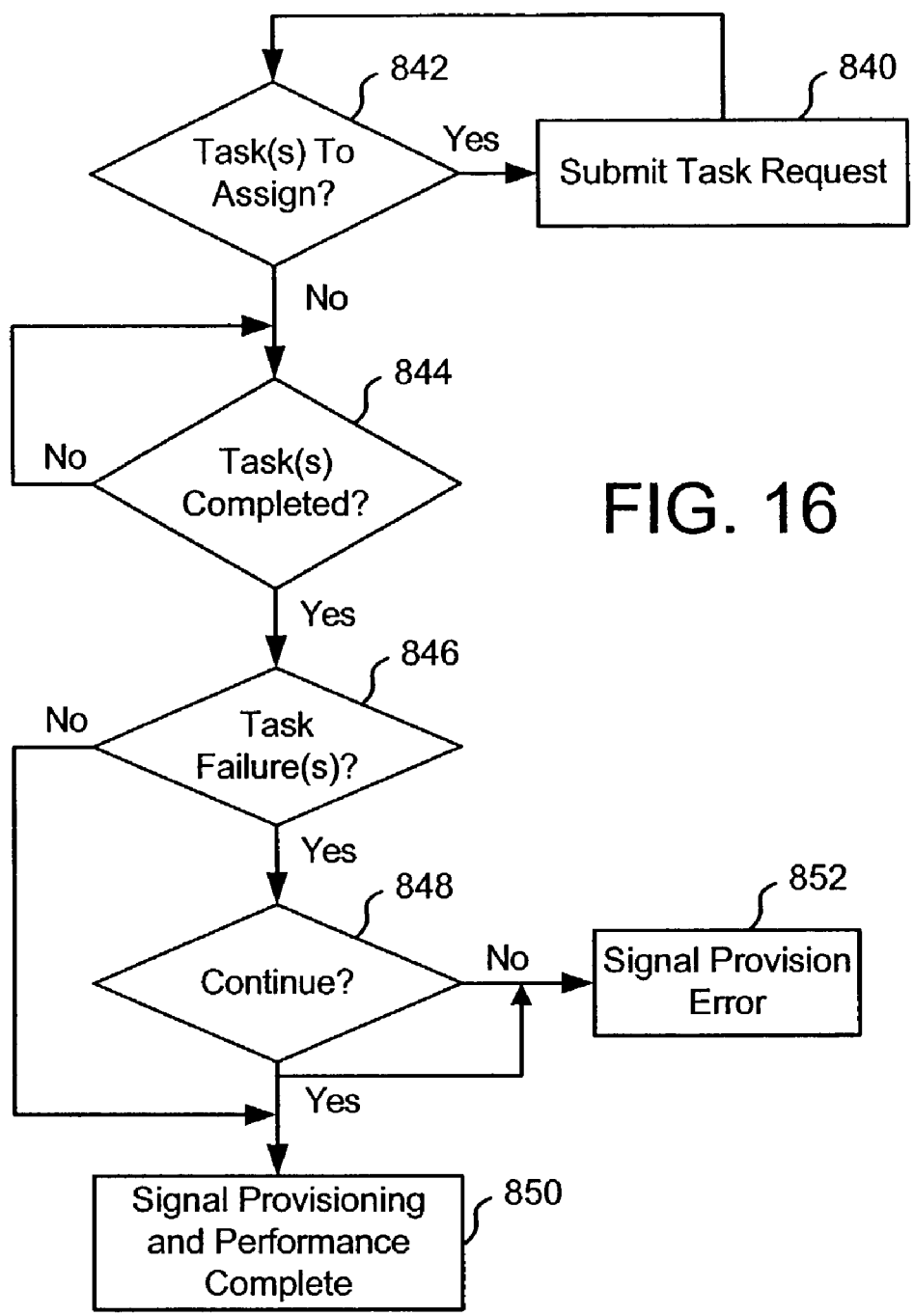
FIG. 16 is a flowchart describing one embodiment of a process for provisioning tasks.

FIG. 16 is a flow chart describing one embodiment of a process for provisioning job code tasks (step 830, FIG. 14). The embodiment in FIG. 16 employs job code attributes in the user and resource profiles. In alternate embodiments, job codes are not employed to perform task provisioning.

Provisioning Bridge Server 49 determines whether any job code related tasks from the user or resource profiles need to be assigned to a provisioning system (step 842). Provisioning Bridge Server 49 accesses job code attributes in the user and resource profiles and employs control information 300 to determine the required tasks for each job code and the provisioning systems that perform those tasks. Control information 300 identifies the external resources, such as Target and Type, that need to be accessed for a job code and the provisioning system that supports each of the resources. If the job code is being added to a profile's job code attribute, Provisioning Bridge Server 49 recognizes that the required tasks will call for providing access to the external resources specified for the job code. If the job code is being deleted from a profile's job code attribute, Provisioning Bridge Server 49 recognizes that the required tasks will call for removing access to the external resources specified for the job code.

If there are tasks that have not yet been assigned to a provisioning system, Provisioning Bridge Server 49 submits a request to one of the provisioning systems (systems 310 and 320, FIG. 7) to perform a job code related task (step 840). Provisioning Bridge Server 49 submits the request to the provisioning system that is identified in control information 300 as corresponding to the external resources being affected by the job code task. After the task request is submitted, Provisioning Bridge Server 49 determines whether any job code related tasks still need to be assigned to a provisioning system (step 842).

Once all of the job code related tasks have been assigned, Provisioning Bridge Server 49 waits for the requested tasks to be completed (step 844), regardless of whether they have failed or completed successfully. In one implementation, each provisioning system signals when a task has been completed—indicating whether it completed the task successfully or failed. Provisioning Bridge Server 49 determines whether any of the tasks failed (step 846). If none of the tasks failed, Provisioning Bridge Server 49 signals that the job code related tasks have all been, provisioned and successfully performed (step 850).

If any of the tasks failed (step 846), Provisioning Bridge Server 49 determines whether to continue with provisioning step 830 (FIG. 14) or cancel all provisioning (step 848). If Provisioning Bridge Server 49 is not to proceed with provisioning, a provisioning error is signaled (step 852). In some embodiments, Provisioning Bridge Server 49 may also undo tasks that have already been completed. If provisioning is to continue, Provisioning Bridge Server 49 proceeds to signal that the successfully completed tasks have been provisioned and performed (step 850). In one implementation, Provisioning Bridge Server 49 also provides a signal identifying the failed tasks (step 852).

In further embodiments, Provisioning Bridge Server 49 does not submit all of the task requests and wait for their completion before proceeding. Instead, each task request is assigned to a separate thread of operation and proceeds individually. In one implementation this processing occurs in parallel. In yet another implementation, this processing occurs serially.

Although embodiments of the present invention have been described above with respect to provisioning, wrapper profiles are useful—in other circumstances. Wrapper profiles are useful in any instance where multiple entities attempt to simultaneously access the same information in Directory Server 36. Examples of such competing entities include Identity Servers and Provisioning Bridge Servers. This includes accesses by Identity Server applications, including User Manager, Group Manager, and Organization Manager. In further embodiments, entities outside of the Identity System or Access System may also attempt to access information in Directory Server 36. These entities include third party applications that interoperate with the Access System and Identity System. These third party applications exchange information with the Identity and Access Systems using XML documents in one embodiment. Details about these exchanges are provided in U.S. patent application Ser. No. 09/997,410, "Preparing Output XML Based on Selected Programs and XML Templates," which is incorporated herein by reference. In one example, a third party application uses XML formatted documents to exchange information with wrappers and their corresponding profiles, as well as perform LDAP searches of Directory Server 36.

In further embodiments, an entity is restricted to accessing wrappers and corresponding profiles that are controlled only by the entity. In one such embodiment, the wrapper profile identification steps described above all include the extra limitation of only identifying wrapper profiles that have a Component Identifier attribute value that corresponds to the entity attempting to access the profile. For example, Provisioning Bridge Server 49 can only access wrapper profiles with a Component Identifier attribute value of Identity Server 40, Organization Manager 46, or Provisioning Bridge Server 49.

This restriction can be employed to limit access to a group of wrappers and their underlying profiles to applications associated with a particular Identity Server. In this embodiment, only the User Manager, Group Manager, Organization Manager, and Provisioning Bridge Server associated with the Identity Server are allowed to access the wrapper profiles. This automatically blocks all accesses of the wrappers and their associated profiles by other Identity Servers or applications.

In yet another mode of operation, each combination of a wrapper and associated profile is processed separately as opposed to the group approach described above with respect to FIGS. 12 and 14. In the provisioning application shown in FIGS. 12 and 14, Provisioning Bridge Server 49 blocked other entities from accessing a user profile and all related resource profiles—setting the locking state for all corresponding wrapper profiles. In further embodiments, this may not be the case. For example, the provisioning request queue may include a separate entry for each resource profile—identifying the corresponding wrapper profile, Component Identifier, and Locking Status of the wrapper profile. In this embodiment, the provisioning of each resource associated with a user is not necessarily carried out by the same Provisioning Bridge Server. The provisioning associated with each resource profile may be serviced by a different Provisioning Bridge Server.

Figure 17:
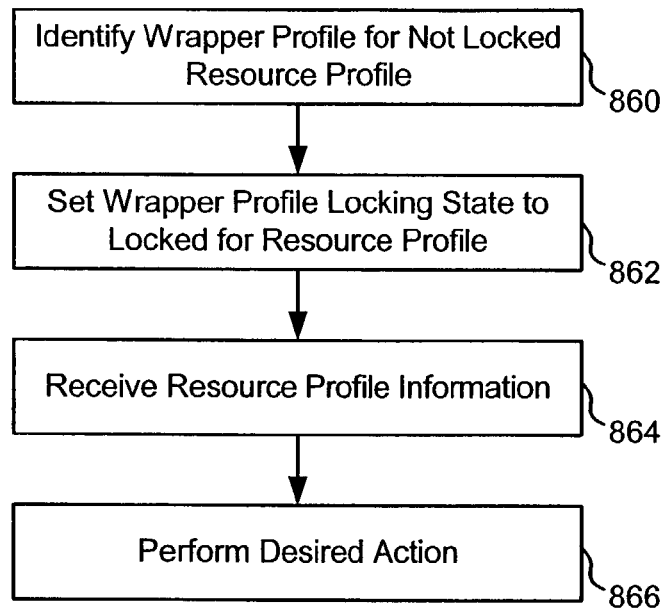
FIG. 17 is a flowchart describing one embodiment of a process for gaining access to a profile that is not locked.

FIG. 17 shows one embodiment of a process for servicing a provisioning request for a single resource profile. Provisioning Bridge Server 49 identifies a wrapper profile for the resource profile corresponding to the provisioning request (step 860). In one embodiment, Provisioning Bridge Server 49 performs an LDAP search for a wrapper profile that meets the following criteria: 1) a distinguished name matching the Status Name field in the provisioning request; and 2) a Locking Status attribute value of not locked. Provisioning Bridge Server 49 then locks the resource profile by setting the wrapper profile's locking state to locked—in one embodiment, setting the locking state as described in FIG. 15. Provisioning Bridge Server 49 then proceeds to receive resource profile information (step 864) and perform the desired action (step 866), such as provisioning tasks. The process shown in FIG. 17 can be used for applications other than provisioning and profiles other than resource profiles. In further embodiments, processing error detection can also be incorporated into the process shown in FIG. 17 in the same manner as described above with reference to FIGS. 12 and 13.

Figure 18:
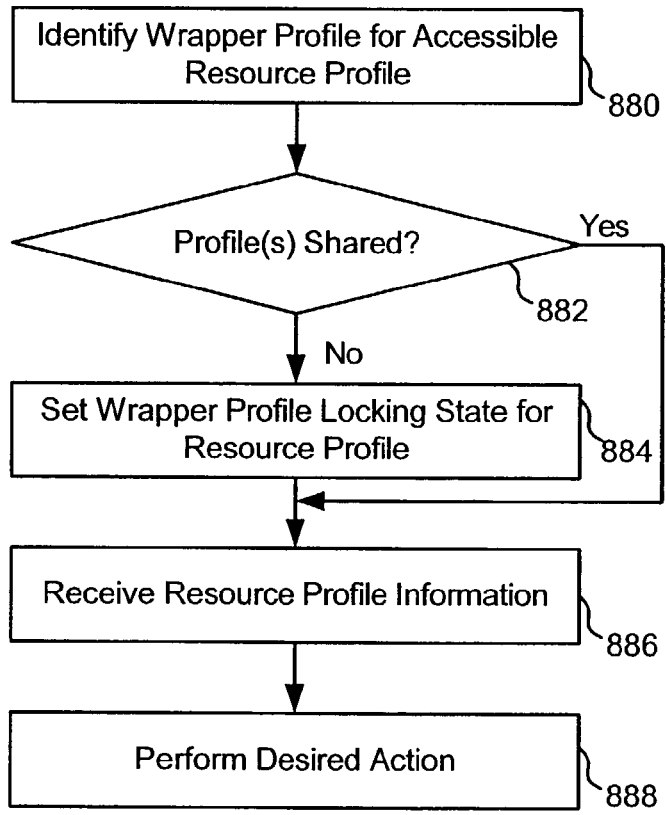
FIG. 18 is a flowchart describing one embodiment of a process for gaining shared access to a profile.

Much of the discussion above relating to wrapper profiles has focused on distinguishing between the wrapper profile's locked and not locked state. In some implementations, the shared state is also employed in the Locking Status attribute. In the shared state, other entities may access the profile corresponding to the wrapper profile to read information. Modifying the profile, however, is not permitted. This may be useful when one application is attempting to modify a user profile to add new attributes, while another entity wishes to read the values of existing attributes. FIG. 18 provides one embodiment of a process for employing wrapper profiles in shared profile accesses. The process shown in FIG. 18 is described with respect to Provisioning Bridge Server 49 being the entity attempting to access a resource profile. Those skilled in the art will recognize, however, that any other application may carry out the steps shown in FIG. 18 for any type of profile.

Provisioning Bridge Server 49 identifies a wrapper profile for an accessible resource profile (step 880). In one embodiment, step 880 can be performed through an LDAP search of Directory Server 36—searching for a wrapper profile that meets the following criteria: 1) a distinguished name corresponding to the Status Name in the provisioning request; and 2) a Locking Status attribute of either not locked or shared. Provisioning Bridge Server 49 determines whether the locking state of the wrapper profile is shared—meaning that the Locking Status attribute is set to shared (step 882).

If the wrapper profile's locking state is shared, Provisioning Bridge Server 49 receives resource profile information relating to the provisioning task to be performed (step 886). Otherwise, Provisioning Bridge Server 49 sets the locking state of the wrapper profile to locked—preventing others from accessing the underlying resource profile (step 884). In alternate embodiments, Provisioning Bridge Server 49 sets the wrapper profile's locking state to shared. In setting the locking state, Provisioning Bridge Server 49 employs the process shown in FIG. 15 in one embodiment. Once the wrapper profile's locking state is set, Provisioning Bridge Server 49 receives resource profile information (step 886). Provisioning Bridge Server 49 then moves on to performed the desired action, such as carrying out the provisioning of tasks (step 888).

The processes shown in FIGS. 17 and 18 are described with respect to identifying a wrapper profile for only a single resource profile. In further embodiments, the processes shown in FIGS. 17 and 18 can be modified to identify wrapper profiles for multiple resource profiles. These operations can be carried out serially by a single thread of operation or in parallel by multiple threads of operation.

As described above, wrapper profiles can be very useful in carrying out resource provisioning. In many instances, resource provisioning is performed as part of a workflow, such as a workflow for modifying a user profile or creating a user profile. In further embodiments, different workflows may call for different operations to be performed where the use of wrapper profiles is also important.

A lot of the tasks that are performed in the Identity System are accomplished using workflows. As described above, a workflow can initiate the process of provisioning resources. This may occur in a workflow that creates or modifies a user profile. In general, a workflow is a predefined set of steps that perform a specific task, where information or tasks are passed between participants and programs according to a defined set of rules. One embodiment of the present invention supports the following types of workflows: create object; delete object; change the value of attributes; and certificate issuance, revocation and renewal. In one embodiment of the present invention, a user is required to change the value of an attribute, implement certificates or create a workflow to create or delete an object, such as a user or resource profile. Workflows ensure that an organization's guidelines for performing a task are met. Workflows can be defined in the User Manager, Group Manager or Organization Manager. In one implementation, a workflow can be used only in the application (e.g. User Manager) in which it was created. Each workflow has two or more steps, including one to start the action and one to implement or commit it. Each step can contain an action, send e-mail notifications to selected persons and start the next step if its entry conditions are satisfied. A workflow is associated with a portion of the directory tree. This allows an entity to have its organizations and partners enforce different workflows. Workflows can be stored in Directory Server 36.

Table 2 provides examples of different tasks that can be performed with workflows in the appropriate applications:

TABLE 2

| Application | Workflow Tasks |
| --- | --- |
| User Manager | Create User |
|  | Delete User |
|  | Change Attribute |
|  | Certificate Enrollment |
|  | Certificate Renewal |
|  | Certificate Revocation |
| Group Manager | Create Group |
|  | Delete Group |
|  | Change Attribute |
| Org. Manager | Create Object |
|  | Delete Object |
|  | Change Attribute |

Each workflow includes two or more steps. Each step can include one or more actions. More information relating to different actions that can be performed with various types of workflows is provided in U.S. patent application Ser. No. 09/997,410, "Preparing Output XML Based on Selected Programs and XML Templates," which is incorporated herein by reference.

FIG. 19 is a flowchart describing the process of using a workflow. The process of FIG. 19 is performed, for example, when creating a new user, a new group, etc. The relevant manager (e.g. user, group or organization) receives a request to perform an action that requires a workflow (step 940). Most actions are likely to have an effect on at least one identity profile in the directory. It is determined whether this user is allowed to initiate the workflow (step 942). If not, the process of FIG. 19 is completed. If so, the GUI determines and reports a set of one or more workflows (step 944). This set of one or more workflows meets three criteria: (1) the user is allowed to use the workflows, (2) the workflows perform the requested task and (3) the workflows are associated with a domain that includes the target of the task. For example, if user A has requested to modify the attributes of Employee 8 (identity profile 164 of FIG. 3), then the system will identify and report workflows that (1) user A has permission to access, (2) perform attribute modification and (3) are associated with a domain that includes identity profile 164 of FIG. 3. In one embodiment, the identified workflows are displayed in a menu.

In some situations, a workflow is requested without knowing the location of the target identity profile. For example, a user can request to create an object without indicating where to store the object in the directory. In such a scenario, the system will find and report workflows that perform the requested task and can be accessed by the user. When the system reports the list of workflows (e.g. via a GUI), the system will also report the domain associated with each workflow. In this situation, step 946 includes the system receiving a selection from the user of the workflow desired, and the domain to operate on.

The system receives a selection from the user of the workflow desired (step 946). Note that if step 944 only identified one workflow, then step 946 can be skipped or performed automatically. It is determined whether the user is allowed to perform this workflow step (step 950). If not, the process of FIG. 19 is completed, at least temporarily. One embodiment of the process of FIG. 19 does not include step 950. If the user is allowed to perform the step, then the event catalog is accessed (step 952). The event catalog is a list of events that trigger actions external to the workflow, such as provisioning. In one embodiment, the event catalog is only checked if the template allowed for the use of external actions. For example, one of the actions allowed in a workflow step and defined in a template is "external_action."

Pre-notifications, if any, defined in the workflow are sent out (step 954). Cross application workflows, if any, are invoked, as per the event catalog (step 956). The current step of the workflow is performed (step 958). It is then determined whether there are supplied variables (step 960). When creating a workflow, the creator had the option of defining the types of variables. Supplied variables are those variables whose value will be supplied by a subflow. If the current step has a supplied variables, then the system searches for any workflows that can supply the variable and apply to the appropriate domain. If only one workflow is found for each supplied variable, then those workflows are initiated as a subflow (step 962). If multiple workflows are found for a particular supplied variable, then the user is given a choice and the chosen workflow is initiated as a subflow in step 962. Note that the subflow could itself have a subflow, which could itself have a subflow, and so on. There is no limitation on the number of subflow nestings.

If there are no supplied variables, or after the subflow(s) are started, the event catalog is accessed (step 964). Note that cross application workflows can be started pre-step or post-step. Step 964 is for post-step cross application workflows. Post step notifications are sent out, if any (step 966). The next step is accessed from the workflow definition (step 968). If there are no more steps, then the process of FIG. 19 is completed. The event catalog is checked (step 970), and pre-notifications are sent out (step 972).

The system determines whether the user is allowed to perform the next step (step 974). If not, the process of FIG. 19 is stopped. If so, the system determines whether it has to wait for the subflow(s) started in the previous workflow step (step 976). In one embodiment, a flag is set at workflow creation time to indicate that the workflow should wait or not wait. If there is a subflow and the current workflow has to wait, the system continues to wait until the subflow is completed. If there is no subflow or it does not have to wait, then the system determines whether all entry conditions have been satisfied (step 978). If not, the system waits for the entry conditions to be satisfied. If yes, the process continues to step 958.

Note that different steps may be set up for performance by different users. Thus, a first user may start the workflow but a different user or a different set of users may be needed for intermediate steps. Therefore, the process of FIG. 19 performed by the initial user may temporarily halt. As described above, if another user is needed to perform a step, that user will be notified either by e-mail or through one of the request tabs discussed above or by alternative means. When that user desires to perform the step, the user will request access to the workflow in step 984 of FIG. 19. For example, the user can respond to a link in an e-mail or select a workflow listed in one of the request tabs. In step 986, the step for that particular user is accessed, and then the method continues with step 974 of FIG. 19.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of controlling profile access, comprising the steps of:

identifying a first and second profile each including multiple objects and attribute sets, the first and second profiles each configured to identify an entity in a directory server, wherein each of the attribute sets describing at least one trait of each entity, and wherein each attribute set is included in each of the multiple objects;

identifying a template for each attribute set including configuration information other than schema information for at least one attribute in each attribute set;

configuring the first and second profiles by configuring each attribute set, based at least in part on the configuration information, wherein each attribute set includes at least a first attribute of a first type and a second attribute of a second type, and wherein the first attribute of the first profile is set to a first value and the first attribute of the second profile is set to a second value;

creating a wrapper profile for the first profile, wherein:
said wrapper profile is stored as a profile in the directory server separately from said first profile,
said wrapper profile controls access to said first profile,
said wrapper profile comprises the attribute sets which further include a locking status attribute,
said locking status attribute identifying the accessibility of said first profile corresponding to said wrapper profile,
said wrapper profile is created as part of a first workflow,
said first workflow defines an approval process for performing one or more tasks to said first profile, and
said first workflow defines multiple actions of the approval process and defines multiple users that receive notifications corresponding to actions of the first workflow;

setting a locking state of said locking status attribute of said wrapper profile for said first profile by a first entity, wherein when said locking status attribute of said wrapper profile is locked, said first profile is locked and not accessible by another entity for writing or modifying, and wherein when said locking status attribute of said wrapper profile is locked, said first profile is accessible for viewing by the first entity or a second entity;

performing a task related to said first profile after said setting step is performed, which setting step causes said first profile to be not locked and accessible by another entity, shared and accessible by a plurality of entities, or locked and not accessible by another entity;

enabling provisioning of said first profile using a provisioning system, said provisioning system receiving a request from a provisioning bridge server to grant or remove access to an external resource, and said provisioning bridge server being coupled to said directory server, wherein said provisioning bridge server uses said wrapper profile to ensure that said first profile is not being locked by said second entity;

determining said wrapper profile is no longer needed for the first workflow; and in response to determining said wrapper profile is no longer needed for the first workflow, deleting said wrapper profile.

2. The method according to claim 1, wherein said setting step causes said first profile to be not locked and accessible by another entity.

3. The method according to claim 1, wherein said setting step causes said first profile to be shared and accessible by a plurality of entities.

4. The method according to claim 1, wherein said setting step causes said first profile to be locked and not accessible by another entity.

5. The method according to claim 1, wherein said method further comprises the step of:
setting said locking state of said locking status attribute of said wrapper profile to unlock said first profile.

6. The method according to claim 1, wherein said task is servicing a provisioning request.

7. The method according to claim 1, wherein said setting step comprises the steps of:
setting a current time stamp in said wrapper profile;
setting a locking status of said locking status attribute in said wrapper profile; and
setting a component identifier in said wrapper profile.

8. The method according to claim 1, wherein said first profile is a user profile.

9. The method according to claim 1, wherein said first profile is a resource profile.

10. The method according to claim 1, wherein said method is performed as part of an Identity System.

11. The method according to claim 1, wherein said method is performed as part of an Access System.

12. The method according to claim 1, wherein said method is performed as part of an integrated Identity/Access System.

13. One or more processor readable storage devices having processor readable code embodied on said one or more processor readable storage devices, said processor readable code for programming one or more processors to perform a method comprising the steps of:
identifying a first and second profile each including multiple objects and attribute sets, the first and second profiles each configured to identify an entity in a directory server, wherein each of the attribute sets describing at least one trait of each entity, and wherein each attribute set is included in each of the multiple objects;

identifying a template for each attribute set including configuration information other than schema information for at least one attribute in each attribute set;

configuring the first and second profiles by configuring each attribute set, based at least in part on the configuration information, wherein each attribute set includes at least a first attribute of a first type and a second attribute of a second type, and wherein the first attribute of the first profile is set to a first value and the first attribute of the second profile is set to a second value;

creating a wrapper profile for the first profile, wherein:
said wrapper profile is stored as a profile in the directory server separately from said first profile,
said wrapper profile controls access to said first profile,
said wrapper profile comprises the attribute sets which further include a locking status attribute,
said locking status attribute identifying the accessibility of said first profile corresponding to said wrapper profile,
a first workflow defines an approval process for performing one or more tasks to said first profile;
said first workflow defines multiple actions of the approval process of the first workflow;

setting a locking state of said locking status attribute of said wrapper profile for said first profile by a first entity, wherein when said locking status attribute of said wrapper profile is locked, said first profile is locked and not accessible by another entity for writing or modifying, and wherein when said locking status attribute of said wrapper profile is locked, said first profile is accessible for viewing by the first entity or the second entity;

performing a task related to said first profile after said setting step is performed, which setting step causes said first profile to be not locked and accessible by another entity, shared and accessible by a plurality of entities, or locked and not accessible by another entity;

enabling provisioning of said first profile using a provisioning system, said provisioning system receiving a request from a provisioning bridge server to grant or remove access to an external resource, and said provisioning bridge server being coupled to said directory server, wherein said provisioning bridge server uses said wrapper profile to ensure that said first profile is not being locked by said second entity;

determining said wrapper profile is no longer needed for the first workflow; and in response to determining said wrapper profile is no longer needed for said first workflow, deleting said wrapper profile.

14. One or more processor readable storage devices according to claim 13, wherein said setting step causes said first profile to be locked and not accessible by another entity.

15. One or more processor readable storage devices according to claim 13, wherein said method further comprises the step of:
setting said locking state of said wrapper profile to unlock said first profile.

16. One or more processor readable storage devices according to claim 13, wherein said method is performed as part of an Identity System.

17. One or more processor readable storage devices according to claim 13, wherein said method is performed as part of an Access System.

18. An apparatus, comprising:
one or more storage devices; and
one or more processors in communication with said one or more storage devices, said one or more processors to perform a method comprising the steps of:
identifying a first and second profile each including multiple objects and attribute sets, the first and second profiles each configured to identify an entity in a directory server, wherein each of the attribute sets describing at least one trait of each entity, and wherein each attribute set is included in each of the multiple objects;
identifying a template for each attribute set including configuration information other than schema information for at least one attribute in each attribute set;
configuring the first and second profiles by configuring each attribute set, based at least in part on the configuration information, wherein each attribute set includes at least a first attribute of a first type and a second attribute of a second type, and wherein the first attribute of the first profile is set to a first value and the first attribute of the second profile is set to a second value;
creating a wrapper profile for the first profile wherein:
said wrapper profile is stored as a profile in the directory server separately from said first profile,
said wrapper profile controls access to said first profile,
said wrapper profile comprises the attribute sets which further include a locking status attribute, said locking status attribute identifying the accessibility of said first profile corresponding to said wrapper profile,
said wrapper profile is created as part of a first workflow;
said first workflow defines an approval process for performing one or more tasks to said first profile, and
said first workflow defines multiple actions of the approval process;
setting a locking state of said locking status attribute of said wrapper profile for said first profile by a first entity, wherein when said locking status attribute of said wrapper profile is locked, said first profile is locked and not accessible by another entity for writing or modifying, and wherein when said locking status attribute of said wrapper profile is locked, said first profile is accessible for viewing by the first entity or a second entity;
performing a task related to said first profile after said setting step is performed, which setting step causes said first profile to be not locked and accessible by another entity, shared and accessible by a plurality of entities, or locked and not accessible by another entity;
enabling provisioning of said first profile using a provisioning system, said provisioning system receiving a request from a provisioning bridge server to grant or remove access to an external resource, and said provisioning bridge server being coupled to said directory server, wherein said provisioning bridge server uses said wrapper profile to ensure that said first profile is not being locked by said second entity;
performing a task related to said first profile after said setting step is performed;
determining said wrapper profile is no longer needed for the first workflow; and
in response to determining said wrapper profile is no longer needed for the first workflow, deleting said wrapper profile.

19. One or more processor readable storage devices having processor readable code embodied on said one or more processor readable storage devices, said processor readable code for programming one or more processors to perform a method comprising the steps of:
identifying a first and second profile each including multiple objects and attribute sets, the first and second profiles each configured to identify an entity in a directory server, wherein each of the attribute sets describing at least one trait of each entity, and wherein each attribute set is included in each of the multiple objects;
identifying a template for each attribute set including configuration information other than schema information for at least one attribute in each attribute set;
configuring the first and second profiles by configuring each attribute set, based at least in part on the configuration information, wherein each attribute set includes at least a first attribute of a first type and a second attribute of a second type, and wherein the first attribute of the first profile is set to a first value and the first attribute of the second profile is set to a second value;
creating the first profile and a wrapper profile corresponding to said first profile, wherein:
said wrapper profile is stored as a profile in the directory server separately from said first profile and the attribute sets which further include a locking status attribute,
said locking status attribute identifying the accessibility of said first profile corresponding to said wrapper profile,
said wrapper profile is created as part of a first workflow,
said first workflow defines an approval process for performing one or more tasks to said first profile, and
said first workflow defines multiple actions of the approval process of the first workflow;
setting a locking state of said locking status attribute of said wrapper profile for said first profile by a first entity, wherein when said locking status attribute of said wrapper profile is locked, said first profile is locked and not accessible by another entity for writing or modifying, and wherein when said locking status attribute of said wrapper profile is locked, said first profile is accessible for viewing by the first entity or a second entity;
performing a task related to said first profile after said setting step is performed, which setting step causes said first profile to be not locked and accessible by another entity, shared and accessible by a plurality of entities, or locked and not accessible by another entity;
enabling provisioning of said first profile using a provisioning system, said provisioning system receiving a request from a provisioning bridge server to grant or remove access to an external resource, and said provisioning bridge server being coupled to said directory server, wherein said provisioning bridge server uses said wrapper profile to ensure that said first profile is not being locked by said second entity;
locking said first profile;
determining said wrapper profile is no longer needed for the first workflow; and
in response to determining said wrapper profile is no longer needed for the first workflow, deleting said wrapper profile.

20. One or more processor readable storage devices according to claim 19, wherein said locking step comprises the step of:
setting a locking state of a wrapper profile corresponding to said first profile.

21. One or more processor readable storage devices according to claim 19, wherein said method further comprises the steps of:
performing a task related to said first profile after said locking step is performed; and
unlocking said first profile.

22. One or more processor readable storage devices according to claim 19, wherein said method is performed as part of an Identity System.

23. One or more processor readable storage devices according to claim 19, wherein said method is performed as part of an Access System.

24. A method of controlling profile access, comprising the steps of:
- identifying a first and second profile each including multiple objects and attribute sets, the first and second profiles each configured to identify an entity in a directory server, wherein each of the attribute sets describing at least one trait of each entity, and wherein each attribute set is included in each of the multiple objects;
- identifying a template for each attribute set including configuration information other than schema information for at least one attribute in each attribute set;
- configuring the first and second profiles by configuring each attribute set, based at least in part on the configuration information, wherein each attribute set includes at least a first attribute of a first type and a second attribute of a second type, and wherein the first attribute of the first profile is set to a first value and the first attribute of the second profile is set to a second value;
- selecting a task request corresponding to the first profile;
- accessing a wrapper profile corresponding to said first profile to determine if said first profile is locked, wherein:
    - said wrapper profile is stored as a profile in the directory server separately from said first profile and the attribute sets which further include a locking status attribute,
    - said locking status attribute identifies the accessibility of said first profile corresponding to said wrapper profile,
    - said wrapper profile is created as part of a first workflow,
    - said first workflow defines an approval process for performing one or more tasks to said first profile, and
    - said first workflow defines multiple actions of the approval process of the first workflow;
- enabling provisioning of said first profile using a provisioning system, said provisioning system receiving a request from a provisioning bridge server to grant or remove access to an external resource, and said provisioning bridge server being coupled to said directory server, wherein said provisioning bridge server uses said wrapper profile to ensure that said first profile is not being locked by a second entity; and
- setting a locking state of said locking status attribute of said wrapper profile to lock said first profile by a first entity, if it is determined in said accessing step that said wrapper profile is not locked, wherein when said locking status attribute of said wrapper profile is locked, said first profile is locked and not accessible by another entity for writing or modifying, and wherein when said locking status attribute of said wrapper profile is locked, said first profile is accessible for viewing by the first entity or said second entity;
- performing a task related to said first profile after said setting step is performed, which setting step causes said first profile to be not locked and accessible by another entity, shared and accessible by a plurality of entities, or locked and not accessible by another entity; and
- determining said wrapper profile is no longer needed for the first workflow; and
- in response to determining said wrapper profile is no longer needed for the first workflow, deleting said wrapper profile.

25. The method according to claim 24, wherein said method further comprises the step of:
- determining whether an error occurred, if it is determined in said accessing step that said wrapper profile is locked.

26. The method according to claim 25, wherein said determining step comprises the step of:
- determining whether said first profile has been locked for at least a threshold period of time.

27. The method according to claim 26, wherein said determining step comprises the step of:
- determining whether said wrapper profile was last set to have a locking state of locked at least said threshold period of time before said determining step is performed.

28. The method according to 27, further comprising the step of:
- setting said locking state of said wrapper profile to locked, if it is determined in said determining step that said error occurred.

29. The method according to claim 28, wherein said error is said first profile being locked for at least said threshold period of time and said setting step comprises the steps of:
- setting a current time stamp of said wrapper profile;
- setting a locking status of said wrapper profile to locked; and
- setting a component identifier of said wrapper profile.

30. The method according to claim 24, wherein at least one profile corresponds to said first profile and said method further comprises the steps of:
- receiving information from said wrapper profile, wherein said information corresponds to said first profile;
- identifying a wrapper profile for each unlocked profile in said at least one profile; and
- setting a locking state for each wrapper profile identified in said identifying step.

31. The method according to claim 30, wherein said locking state causes said each unlocked profile in said at least one profile to be locked.

32. The method according to claim 30, wherein said method further comprises the step of:
- unlocking said first profile after at least one task related to said first profile has been performed.

33. The method according to claim 32, wherein said unlocking step includes the step of deleting said wrapper profile.

34. The method according to claim 32, wherein:
- said first profile is a user profile,
- said each unlocked profile in said at least one profile includes at least one resource profile, and
- said at least one task includes provisioning at least one resource.

35. The method according to claim 24, wherein said method is performed as part of an Identity System.

36. The method according to claim 24, wherein said method is performed as part of an Access System.

37. One or more processor readable storage devices having processor readable code embodied on said one or more processor readable storage devices, said processor readable code for programming one or more processors to perform a method comprising the steps of:
- identifying a first and second profile each including multiple objects and attribute sets, the first and second profiles each configured to identify an entity in a directory server, wherein each of the attribute sets describing at least one trait of each entity, and wherein each attribute set is included in each of the multiple objects;

identifying a template for each attribute set including configuration information other than schema information for at least one attribute in each attribute set;

configuring the first and second profiles by configuring each attribute set, based at least in part on the configuration information, wherein each attribute set includes at least a first attribute of a first type and a second attribute of a second type, and wherein the first attribute of the first profile is set to a first value and the first attribute of the second profile is set to a second value;

selecting a task request corresponding to the first profile;

accessing a wrapper profile corresponding to said first profile to determine if said first profile is locked, wherein:
- said wrapper profile is stored as a profile in the directory server separately from said first profile and the attribute sets which further include a locking status attribute,
- said locking status attribute identifying the accessibility of said first profile corresponding to said wrapper profile,
- said wrapper profile is created as part of a first workflow,
- said first workflow defines an approval process for performing one or more tasks to said first profile, and
- said first workflow defines multiple actions of the approval process and defines multiple users that receive notifications corresponding to actions of the first workflow;

enabling provisioning of said first profile using a provisioning system, said provisioning system receiving a request from a provisioning bridge server to grant or remove access to an external resource, and said provisioning bridge server being coupled to said directory server, wherein said provisioning bridge server uses said wrapper profile to ensure that said first profile is not being locked by a second entity; and setting a locking state of said locking status attribute of said wrapper profile to lock said first profile by a first entity, if it is determined in said accessing step that said wrapper profile is not locked, wherein when said locking status attribute of said wrapper profile is locked, said first profile is locked and not accessible by another entity for writing or modifying, and wherein when said locking status attribute of said wrapper profile is locked, said first profile is accessible for viewing by the first entity or said second entity;

performing a task related to said first profile after said setting step is performed, which setting step causes said first profile to be not locked and accessible by another entity, shared and accessible by a plurality of entities, or locked and not accessible by another entity;

determining said wrapper profile is no longer needed for the first workflow; and in response to determining said wrapper profile is no longer needed for the first workflow, deleting said wrapper profile.

38. One or more processor readable storage devices according to claim 37, wherein said method further comprises the step of:
determining whether an error occurred, if it is determined in said accessing step that said wrapper profile is locked.

39. One or more processor readable storage devices according to claim 38, wherein said determining step comprises the steps of:
determining whether said first profile has been locked for at least a threshold period of time.

40. One or more processor readable storage devices according to claim 39, wherein said determining step comprises the step of:
determining whether said wrapper profile was last set to have a locking state of locked at least said threshold period of time before said determining step is performed.

41. One or more processor readable storage devices according to claim 37, wherein at least one profile corresponds to said first profile and said method further comprises the steps of:
receiving information from said wrapper profile, wherein said information corresponds to said first profile;
identifying a wrapper profile for each unlocked profile in said at least one profile; and
setting a locking state for each wrapper profile identified in said identifying step.

42. One or more processor readable storage devices according to claim 41, wherein said method further comprises the step of:
unlocking said first profile after at least one task related to said first profile has been performed.

43. One or more processor readable storage devices according to claim 37 wherein said method is performed as part of an Identity System.

44. A method of controlling profile access, comprising the steps of:
identifying a first and second profile each including multiple objects and attribute sets, the first and second profiles each configured to identify an entity in a directory server, wherein each of the attribute sets describing at least one trait of each entity, and wherein each attribute set is included in each of the multiple objects;

identifying a template for each attribute set including configuration information other than schema information for at least one attribute in each attribute set;

configuring the first and second profiles by configuring each attribute set, based at least in part on the configuration information, wherein each attribute set includes at least a first attribute of a first type and a second attribute of a second type, and wherein the first attribute of the first profile is set to a first value and the first attribute of the second profile is set to a second value;

identifying at least one wrapper profile satisfying criteria, wherein:
- said criteria calls for said at least one wrapper profile to have a locking status of locked and said locking status to have been in place for at least a threshold period of time,
- said at least one wrapper profile is stored as a profile in the directory server separately from said first profile and the attribute sets which further include a locking status attribute,
- said wrapper profile is created as part of a first workflow, and
- said first workflow defines an approval process for performing one or more tasks to said first profile;

setting a locking state of said locking status attribute of said wrapper profile for said first profile by a first entity, wherein when said locking status attribute of said wrapper profile is locked, said first profile is locked and not accessible by another entity for writing or modifying, and wherein when said locking status attribute of said wrapper profile is locked, said first profile is accessible for viewing by the first entity or a second entity;

performing a task related to said first profile after said setting step is performed, which setting step causes said first profile to be not locked and accessible by another entity, shared and accessible by a plurality of entities, or locked and not accessible by another entity;

enabling provisioning of said first profile using a provisioning system, said provisioning system receiving a request from a provisioning bridge server to grant or remove access to an external resource, and said provisioning bridge server being coupled to said directory server, wherein said provisioning bridge server uses said wrapper profile to ensure that said first profile is not being locked by said second entity;

for each wrapper profile identified in said identifying step, setting a current time stamp;

determining said wrapper profile is no longer needed for the first workflow; and in response to determining said wrapper profile is no longer needed for the first workflow, deleting said wrapper profile.

45. The method according to claim 44, wherein said method further comprises the step of:

for each wrapper profile identified in said identifying step, setting a component identifier.

46. The method according to claim 45, wherein said component identifier is changed to a different value in said setting step.

47. The method according to claim 44, wherein said method is performed as part of an Identity System.

48. The method according to claim 44, wherein said method is performed as part of an Access System.

49. One or more processor readable storage devices having processor readable code embodied on said one or more processor readable storage devices, said processor readable code for programming one or more processors to perform a method comprising the steps of:

identifying a first and second profile each including multiple objects and attribute sets, the first and second profiles each configured to identify an entity in a directory server, wherein each of the attribute sets describing at least one trait of each entity, and wherein each attribute set is included in each of the multiple objects;

identifying a template for each attribute set including configuration information other than schema information for at least one attribute in each attribute set;

configuring the first and second profiles by configuring each attribute set, based at least in part on the configuration information, wherein each attribute set includes at least a first attribute of a first type and a second attribute of a second type, and wherein the first attribute of the first profile is set to a first value and the first attribute of the second profile is set to a second value;

identifying at least one wrapper profile satisfying criteria, wherein:

said criteria calls for said at least one wrapper profile to have a locking status of locked and said locking status to have been in place for at least a threshold period of time, said at least one wrapper profile is stored as a profile in the directory server separately from said first profile and the attribute sets which further include a locking status attribute, a workflow defines an approval process for performing one or more tasks to said first profile, and said workflow defines multiple actions of the approval process of the first workflow;

setting a locking state of said locking status attribute of said wrapper profile for said first profile by a first entity, wherein when said locking status attribute of said wrapper profile is locked, said first profile is locked and not accessible by another entity for writing or modifying, and wherein when said locking status attribute of said wrapper profile is locked, said first profile is accessible for viewing by the first entity or a second entity;

performing a task related to said first profile after said setting step is performed, which setting step causes said first profile to be not locked and accessible by another entity, shared and accessible by a plurality of entities, or locked and not accessible by another entity;

enabling provisioning of said first profile using a provisioning system, said provisioning system receiving a request from a provisioning bridge server to grant or remove access to an external resource, and said provisioning bridge server being coupled to said directory server, wherein said provisioning bridge server uses said wrapper profile to ensure that said first profile is not being locked by said second entity;

for each wrapper profile identified in said identifying step, setting a current time stamp; and determining said wrapper profile is no longer needed for the workflow; and in response to determining said wrapper profile is no longer needed for the first workflow, deleting said wrapper profile.

50. One or more processor readable storage devices according to claim 49, wherein said method further comprises the step of:

for each wrapper profile identified in said identifying step, setting a component identifier.

51. One or more processor readable storage devices according to claim 49, wherein said method is performed as part of an Identity System.

52. A method of controlling profile access, comprising the step of:

identifying a first and second profile each including multiple objects and attribute sets, the first and second profiles each configured to identify an entity in a directory server, wherein each of the attribute sets describing at least one trait of each entity, and wherein each attribute set is included in each of the multiple objects;

identifying a template for each attribute set including configuration information other than schema information for at least one attribute in each attribute set;

configuring the first and second profiles by configuring each attribute set, based at least in part on the configuration information, wherein each attribute set includes at least a first attribute of a first type and a second attribute of a second type, and wherein the first attribute of the first profile is set to a first value and the first attribute of the second profile is set to a second value;

identifying at least one wrapper profile corresponding to a criteria, wherein:

said at least one wrapper profile corresponds to at least one profile and said criteria calls for said at least one wrapper profile to have a locking status corresponding to a profile being accessible, said at least one wrapper profile is stored as a profile in the directory server separately from said first profile and the attribute sets which further include a locking status attribute;

a workflow defines an approval process for performing one or more tasks to said first profile, and said first workflow defines multiple actions of the approval process and defines multiple users that receive notifications corresponding to actions of the first workflow;

setting a locking state of said locking status attribute of said wrapper profile for said first profile by a first entity, wherein when said locking status attribute of said wrapper profile is locked, said first profile is locked and not accessible by another entity for writing or modifying, and wherein when said locking status attribute of said wrapper profile is locked, said first profile is accessible for viewing by the first entity or a second entity;

performing a task related to said first profile after said setting step is performed, which setting step causes said first profile to be not locked and accessible by another entity, shared and accessible by a plurality of entities, or locked and not accessible by another entity;

enabling provisioning of said first profile using a provisioning system, said provisioning system receiving a request from a provisioning bridge server to grant or remove access to an external resource, and said provisioning bridge server being coupled to said directory server, wherein said provisioning bridge server uses said wrapper profile to ensure that said first profile is not being locked by said second entity;

for each wrapper profile identified in said identifying step that has a locking status of not locked, setting a locking state;

determining said wrapper profile is no longer needed for the first workflow; and in response to determining said wrapper profile is no longer needed for the first workflow, deleting said wrapper profile.

53. The method according to claim 52, wherein said locking status has a value in a set consisting of shared and not locked.

54. The method according to claim 52, wherein said method further comprises the steps of:
identifying any wrapper profile in said at least one wrapper profile identified in said identifying step that includes a wrapper profile with a shared locking status; and
setting a locking status for any wrapper profile identified in said identifying step.

55. The method according to claim 52, further comprising the step of:
performing at least one action related to said at least one profile.

56. The method according to claim 52, wherein said method is performed as part of an Identity System.

57. The method according to claim 52, wherein said method is performed as part of an Access System.

58. One or more processor readable storage devices having processor readable code embodied on said one or more processor readable storage devices, said processor readable code for programming one or more processors to perform a method comprising the steps of:
identifying a first and second profile each including multiple objects and attribute sets, the first and second profiles each configured to identify an entity in a directory server, wherein each of the attribute sets describing at least one trait of each entity, and wherein each attribute set is included in each of the multiple objects;
identifying a template for each attribute set including configuration information other than schema information for at least one attribute in each attribute set;
configuring the first and second profiles by configuring each attribute set, based at least in part on the configuration information, wherein each attribute set includes at least a first attribute of a first type and a second attribute of a second type, and wherein the first attribute of the first profile is set to a first value and the first attribute of the second profile is set to a second value;

identifying at least one wrapper profile corresponding to a criteria, wherein:
said at least one wrapper profile corresponds to at least one profile and said criteria calls for said at least one wrapper profile to have a locking status corresponding to a profile being accessible,
said at least one wrapper profile is stored as a profile in the directory server separately from said first profile and the attribute sets which further include a locking status attribute,
a first workflow defines an approval process for performing one or more tasks to said first profile, and
said first workflow defines multiple actions of the approval process of the first workflow;

setting a locking state of said locking status attribute of said wrapper profile for said first profile by a first entity, wherein when said locking status attribute of said wrapper profile is locked, said first profile is locked and not accessible by another entity for writing or modifying, and wherein when said locking status attribute of said wrapper profile is locked, said first profile is accessible for viewing by the first entity or a second entity;

performing a task related to said first profile after said setting step is performed, which setting step causes said first profile to be not locked and accessible by another entity, shared and accessible by a plurality of entities, or locked and not accessible by another entity;

enabling provisioning of said first profile using a provisioning system, said provisioning system receiving a request from a provisioning bridge server to grant or remove access to an external resource, and said provisioning bridge server being coupled to said directory server, wherein said provisioning bridge server uses said wrapper profile to ensure that said first profile is not being locked by said second entity;

for each wrapper profile identified in said identifying step that has a locking status of not locked, setting a locking state; and determining said wrapper profile is no longer needed for the first workflow; and in response to determining said wrapper profile is no longer needed for the first workflow, deleting said wrapper profile.

59. One or more processor readable storage devices according to claim 58, wherein said method further comprises the steps of:
identifying any wrapper profile in said at least one wrapper profile identified in said identifying step that comprises a wrapper profile with a shared locking status; and
setting a locking status for any wrapper profile identified in said identifying step.

60. One or more processor readable storage devices according to claim 58, wherein said method is performed as part of an Identity System.

61. A method of controlling profile access, comprising the steps of:
identifying a first and second profile each including multiple objects and attribute sets, the first and second profiles each configured to identify an entity in a directory server, wherein each of the attribute sets describing at least one trait of each entity, and wherein each attribute set is included in each of the multiple objects;
identifying a template for each attribute set including configuration information other than schema information for at least one attribute in each attribute set;

configuring the first and second profiles by configuring each attribute set, based at least in part on the configuration information, wherein each attribute set includes at least a first attribute of a first type and a second attribute of a second type, and wherein the first attribute of the first profile is set to a first value and the first attribute of the second profile is set to a second value;

identifying at least one wrapper profile corresponding to a criteria, wherein:
  said at least one wrapper profile corresponds to at least one profile and said criteria calls for said at least one wrapper profile to have a locking status of not locked,
  said at least one wrapper profile is stored as a profile in the directory server separately from said first profile and the attribute sets which further include a locking status attribute,
  a workflow defines an approval process for performing one or more tasks to said first profile, and
  said workflow defines multiple actions of the approval process of the first workflow;

setting a locking state of said locking status attribute of said wrapper profile for said first profile by a first entity, wherein when said locking status attribute of said wrapper profile is locked, said first profile is locked and not accessible by another entity for writing or modifying, and wherein when said locking status attribute of said wrapper profile is locked, said first profile is accessible for viewing by the first entity or a second entity;

performing a task related to said first profile after said setting step is performed, which setting step causes said first profile to be not locked and accessible by another entity, shared and accessible by a plurality of entities, or locked and not accessible by another entity;

enabling provisioning of said first profile using a provisioning system, said provisioning system receiving a request from a provisioning bridge server to grant or remove access to an external resource, and said provisioning bridge server being coupled to said directory server, wherein said provisioning bridge server uses said wrapper profile to ensure that said first profile is not being locked by said second entity;

for each wrapper profile identified in said identifying step, setting a locking status of said locking status attribute;

determining said wrapper profile is no longer needed for the first workflow; and in response to determining said wrapper profile is no longer needed for the first workflow, deleting said wrapper profile.

62. The method according to claim 61, wherein said locking status set in said setting step is locked.

63. The method according to claim 61, wherein said method is performed as part of an Identity System.

64. The method according to claim 61, wherein said method is performed as, part of an Access System.

65. One or more processor readable storage devices having processor readable code embodied on said one or more processor readable storage devices, said processor readable code for programming one or more processors to perform a method comprising the steps of:
  identifying a first and second profile each including multiple objects and attribute sets, the first and second profiles each configured to identify an entity in a directory server, wherein each of the attribute sets describing at least one trait of each entity, and wherein each attribute set is included in each of the multiple objects;

identifying a template for each attribute set including configuration information other than schema information for at least one attribute in each attribute set;

configuring the first and second profiles by configuring each attribute set, based at least in part on the configuration information, wherein each attribute set includes at least a first attribute of a first type and a second attribute of a second type, and wherein the first attribute of the first profile is set to a first value and the first attribute of the second profile is set to a second value;

identifying at least one wrapper profile corresponding to a criteria, wherein:
    said at least one wrapper profile corresponds to at least one profile and said criteria calls for said at least one wrapper profile to have a locking status of not locked,
    said at least one wrapper profile is stored as a profile in the directory server separately from said first profile and the attribute sets which further include a locking status attribute,
    a first workflow defines an approval process for performing one or more tasks to said first profile, and
    said first workflow defines multiple actions of the approval process and defines multiple users that receive notifications corresponding to actions of the first workflow;

setting a locking state of said locking status attribute of said wrapper profile for said first profile by a first entity, wherein when said locking status attribute of said wrapper profile is locked, said first profile is locked and not accessible by another entity for writing or modifying, and wherein when said locking status attribute of said wrapper profile is locked, said first profile is accessible for viewing by the first entity or a second entity;

performing a task related to said first profile after said setting step is performed, which setting step causes said first profile to be not locked and accessible by another entity, shared and accessible by a plurality of entities, or locked and not accessible by another entity;

enabling provisioning of said first profile using a provisioning system, said provisioning system receiving a request from a provisioning bridge server to grant or remove access to an external resource, and said provisioning bridge server being coupled to said directory server, wherein said provisioning bridge server uses said wrapper profile to ensure that said first profile is not being locked by said second entity;

for each wrapper profile identified in said identifying step, setting a locking status of said locking status attribute; and determining said wrapper profile is no longer needed for the first workflow; and in response to determining said wrapper profile is no longer needed for the first workflow, deleting said wrapper profile.

66. One or more processor readable storage devices according to claim 65, wherein said method is performed as part of an Identity System.

67. A method of controlling profile access, comprising the steps of:
  identifying a first and second profile each including multiple objects and attribute sets, the first and second profiles each configured to identify an entity in a directory server, wherein each of the attribute sets describing at least one trait of each entity, and wherein each attribute set is included in each of the multiple objects;

identifying a template for each attribute set including configuration information other than schema information for at least one attribute in each attribute set;

configuring the first and second profiles by configuring each attribute set, based at least in part on the configuration information, wherein each attribute set includes at least a first attribute of a first type and a second attribute of a second type, and wherein the first attribute of the first profile is set to a first value and the first attribute of the second profile is set to a second value;

creating a user profile;

creating a first wrapper profile for said user profile, wherein said wrapper profile is created as part of a first workflow,
said first workflow defines an approval process for performing one or more tasks to said first profile, and
said first workflow defines multiple actions of the approval process of the first workflow;

creating at least one resource profile corresponding to said user profile;

creating a wrapper profile for each resource profile in said at least one resource profile, wherein said wrapper profile is stored as a profile in the directory server separately from said first profile and the attribute sets which further include a locking status attribute; and setting a locking state of said locking status attribute of said wrapper profile for said first profile by a first entity, wherein when said locking status attribute of said wrapper profile is locked, said first profile is locked and not accessible by another entity for writing or modifying, and wherein when said locking status attribute of said wrapper profile is locked, said first profile is accessible for viewing by the first entity or a second entity;

performing a task related to said first profile after said setting step is performed, which setting step causes said first profile to be not locked and accessible by another entity, shared and accessible by a plurality of entities, or locked and not accessible by another entity;

enabling provisioning of said first profile using a provisioning system, provisioning system receiving a request from a provisioning bridge server to grant or remove access to an external resource, and said provisioning bridge server being coupled to said directory server, wherein said provisioning bridge server uses said wrapper profile to ensure that said first profile is not being locked by said second entity;

determining the wrapper profile is no longer needed for the first workflow; and in response to determining the wrapper profile is no longer needed for the first workflow, deleting said wrapper profile.

68. The method according to claim 67, wherein said method further comprises the step of:
submitting a provisioning request.

69. The method according to claim 68, wherein said method further comprises the steps of:
selecting said provisioning request; and
accessing said first wrapper profile to determine if said user profile is locked; and
setting a locking state of said first wrapper profile to lock said user profile, if it is determined in said accessing step that said user profile is not locked.

70. The method according to claim 69, wherein said method further comprises the step of:
determining whether an error occurred, if it is determined in said accessing step that said first wrapper profile is locked.

71. The method according to claim 69, wherein said method further comprises the steps of:
identifying a wrapper profile for each not locked profile in said at least one resource profile; and
setting a locking state for each wrapper profile identified in said identifying step.

72. The method according to claim 71, wherein said locking state causes said each not locked profile in said at least one resource profile to become locked.

73. The method according to claim 71, wherein said method further comprises the step of:
unlocking said user profile after at least one task called for by said provisioning request is completed.

74. The method according to claim 67, wherein said method is performed as part of an Identity System.

75. The method according to claim 67, wherein said method is performed as part of an Access System.

76. One or more processor readable storage devices having processor readable code embodied on said one or more processor readable storage devices, said processor readable code for programming one or more processors to perform a method comprising the steps of:

identifying a first and second profile each including multiple objects and attribute sets, the first and second profiles each configured to identify an entity in a directory server, wherein each of the attribute sets describing at least one trait of each entity, and wherein each attribute set is included in each of the multiple objects;

identifying a template for each attribute set including configuration information other than schema information for at least one attribute in each attribute set;

configuring the first and second profiles by configuring each attribute set, based at least in part on the configuration information, wherein each attribute set includes at least a first attribute of a first type and a second attribute of a second type, and wherein the first attribute of the first profile is set to a first value and the first attribute of the second profile is set to a second value;

creating a user profile;

creating a first wrapper profile for said user profile, wherein said first wrapper profile is created as part of a first workflow,
said first workflow defines an approval process for performing one or more tasks to said first profile, and
said first workflow defines multiple actions of the approval process and defines multiple users that receive notifications corresponding to actions of the first workflow;

creating at least one resource profile corresponding to said user profile;

creating a wrapper profile for each resource profile in said at least one resource profile, wherein said wrapper profile is stored as a profile in the directory server separately from said first profile and the attribute sets which further include a locking status attribute; and setting a locking state of said locking status attribute of said wrapper profile for said first profile by a first entity, wherein when said locking status attribute of said wrapper profile is locked, said first profile is locked and not accessible by another entity for writing or modifying, and wherein when said locking status attribute of said wrapper profile is locked, said first profile is accessible for viewing by the first entity or a second entity;

performing a task related to said first profile after said setting step is performed, which setting step causes said first profile to be not locked and accessible by another entity, shared and accessible by a plurality of entities, or locked and not accessible by another entity;

enabling provisioning of said first profile using a provisioning system, said provisioning system receiving a request from a provisioning bridge server to grant or remove access to an external resource, and said provisioning bridge server being coupled to said directory server, wherein said provisioning bridge server uses said wrapper profile to ensure that said first profile is not being locked by said second entity;

determining the first wrapper profile is no longer needed for the first workflow; and in response to determining the first wrapper profile is no longer needed for the first workflow, deleting said first wrapper profile.

77. One or more processor readable storage devices according to claim 76, wherein said method further comprises the step of:
submitting a provisioning request.

78. One or more processor readable storage devices according to claim 77, wherein said method further comprises the steps of:
selecting said provisioning request; and
accessing said first wrapper profile to determine if said user profile is locked; and
setting a locking state of said first wrapper profile to lock said user profile, if it is determined in said accessing step that said user profile is not locked.

79. One or more processor readable storage devices according to claim 77, wherein said method further comprises the steps of:
identifying a wrapper profile for each not locked profile in said at least one resource profile;
setting a locking state for each wrapper profile identified in said identifying step; and
unlocking said user profile after at least one task called for by said provisioning request is completed.

80. One or more processor readable storage devices according to claim 76, wherein said method is performed as part of an Identity System.

81. An apparatus, comprising:
one or more storage devices; and
one or more processors in communication with said one or more storage devices, said one or more processors perform a method comprising the steps of:
identifying a first and second profile each including multiple objects and attribute sets, the first and second profiles each configured to identify an entity in a directory server, wherein each of the attribute sets describing at least one trait of each entity, and wherein each attribute set is included in each of the multiple objects;
identifying a template for each attribute set including configuration information other than schema information for at least one attribute in each attribute set;
configuring the first and second profiles by configuring each attribute set, based at least in part on the configuration information, wherein each attribute set includes at least a first attribute of a first type and a second attribute of a second type, and wherein the first attribute of the first profile is set to a first value and the first attribute of the second profile is set to a second value;
creating a user profile;

creating a first wrapper profile for said user profile, wherein:
said first wrapper profile is stored as a profile in the directory server separately from said first profile and the attribute sets which further include a locking status attribute,
said wrapper profile is created as part of a first workflow,
said first workflow defines an approval process for performing one or more tasks to said first profile, and
said first workflow defines multiple actions of the approval process of the first workflow;
creating at least one resource profile corresponding to said user profile;
creating a wrapper profile for each resource profile in said at least one resource profile;
submitting a provisioning request;
selecting said provisioning request;
accessing said first wrapper profile to determine if said user profile is locked;
enabling provisioning of said first profile using a provisioning system, said provisioning system receiving a request from a provisioning bridge server to grant or remove access to an external resource, and said provisioning bridge server being coupled to said directory server;
setting a locking state of said locking status attribute of said wrapper profile for said first profile by a first entity, wherein when said locking status attribute of said wrapper profile is locked, said first profile is locked and not accessible by another entity for writing or modifying, and wherein when said locking status attribute of said wrapper profile is locked, said first profile is accessible for viewing by the first entity or a second entity;
performing a task related to said first profile after said setting step is performed, which setting step causes said first profile to be not locked and accessible by another entity, shared and accessible by a plurality of entities, or locked and not accessible by another entity;
setting a locking state of said locking status attribute of said first wrapper profile to lock said user profile, if it is determined in said accessing step that said user profile is not locked, wherein said provisioning bridge server uses said wrapper profile to ensure that said first profile is not being locked by said second entity; and
determining said wrapper profile is no longer needed for the first workflow; and
in response to determining said wrapper profile is no longer needed for the first workflow, deleting said wrapper profile.

82. The apparatus according to claim 81, wherein said method further comprises the steps of:
identifying a wrapper profile for each not locked profile in said at least one resource profile;
setting a locking state for each wrapper profile identified in said identifying step; and
unlocking said user profile after at least one task called for by said provisioning request is completed.

* * * * *

UNITED STATES PATENT AND TRADEMARK OFFICE
CERTIFICATE OF CORRECTION

PATENT NO. : 8,375,113 B2
APPLICATION NO. : 10/325438
DATED : February 12, 2013
INVENTOR(S) : Sinn et al.

It is certified that error appears in the above-identified patent and that said Letters Patent is hereby corrected as shown below:

On title page 3, in column 1, under "Other Publications", line 1, delete "Hargrave's" and insert -- Hargrave's --, therefor.

On title page 3, in column 1, under "Other Publications", line 4, delete "Diistributed" and insert -- Distributed --, therefor.

On title page 3, in column 1, under "Other Publications", line 5, delete "Coputer," and insert -- Computer, --, therefor.

On title page 3, in column 1, under "Other Publications", line 44, delete "Verson" and insert -- Version --, therefor.

In the Specification:

In column 13, line 18, delete "Syste," and insert -- System --, therefor.

In column 19, line 50, delete "been," and insert -- been --, therefor.

In column 20, line 6, delete "useful—in" and insert -- useful in --, therefor.

In the Claims:

In column 31, line 65, in Claim 39, delete "steps" and insert -- step --, therefor.

In column 37, line 56, in Claim 64, delete "as," and insert -- as --, therefor.

Signed and Sealed this
Fourteenth Day of May, 2013

Teresa Stanek Rea
*Acting Director of the United States Patent and Trademark Office*